US010021255B2

(12) United States Patent
Funakawa

(10) Patent No.: US 10,021,255 B2
(45) Date of Patent: Jul. 10, 2018

(54) PORTABLE TERMINAL DEVICE FOR SELECTING ONE OF A PLURALITY OF OUTPUT IMAGE PROCESSING DEVICES BY COMPARING RADIO WAVE STRENGTHS

(71) Applicant: KONICA MINOLTA, INC., Chiyoda-Ku, Tokyo (JP)

(72) Inventor: Hisataka Funakawa, Okazaki (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 133 days.

(21) Appl. No.: 15/159,869

(22) Filed: May 20, 2016

(65) Prior Publication Data

US 2016/0360049 A1 Dec. 8, 2016

(30) Foreign Application Priority Data

Jun. 2, 2015 (JP) ................. 2015-111906

(51) Int. Cl.
H04N 1/00 (2006.01)
H04W 4/00 (2018.01)
H04W 4/80 (2018.01)

(52) U.S. Cl.
CPC ..... *H04N 1/00307* (2013.01); *H04N 1/00015* (2013.01); *H04N 1/00037* (2013.01); *H04N 1/00061* (2013.01); *H04W 4/008* (2013.01); *H04W 4/80* (2018.02); *H04N 2201/0055* (2013.01); *H04N 2201/0094* (2013.01)

(58) Field of Classification Search
CPC ................................................. H04N 1/00307
See application file for complete search history.

(56) References Cited

U.S. PATENT DOCUMENTS

| 9,332,375 | B2* | 5/2016 | Ishida | H04W 4/80 |
| 2013/0059542 | A1* | 3/2013 | Shimizu | H04W 4/50 |
| | | | | 455/67.11 |
| 2014/0357201 | A1* | 12/2014 | Misumi | H04B 1/401 |
| | | | | 455/78 |
| 2015/0277809 | A1* | 10/2015 | Kim | G06F 3/126 |
| | | | | 358/1.15 |

(Continued)

FOREIGN PATENT DOCUMENTS

JP 2011-120144 A 6/2011

*Primary Examiner* — Benjamin O Dulaney
(74) *Attorney, Agent, or Firm* — Buchanan Ingersoll & Rooney PC

(57) ABSTRACT

A portable terminal device includes: a receiving unit that receives an action instruction in a predetermined action mode given by a user for one image processing device among a plurality of image processing devices; a radio wave strength detection unit that receives a radio wave for measuring the strength of the radio wave to detect the strength of radio wave of each of the image processing devices; a radio wave strength difference calculation unit that calculates differences in the strengths of radio waves between the image processing device with the maximum strength of radio wave and the other image processing devices; an identification unit that identifies, as the image processing device to which the action instruction received is given, the image processing device having the maximum strength of radio wave; and an instruction unit that gives the action instruction in the action mode to the image processing device.

17 Claims, 14 Drawing Sheets

(56) References Cited

U.S. PATENT DOCUMENTS

2016/0254845 A1* 9/2016 Iura ...................... H04W 12/06
455/41.2
2016/0352946 A1* 12/2016 Eguchi ............... H04N 1/00307

* cited by examiner

PORTABLE TERMINAL DEVICE FOR SELECTING ONE OF A PLURALITY OF OUTPUT IMAGE PROCESSING DEVICES BY COMPARING RADIO WAVE STRENGTHS

The entire disclosure of Japanese Patent Application No. 2015-111906 filed on Jun. 2, 2015 including description, claims, drawings, and abstract are incorporated herein by reference in its entirety.

BACKGROUND OF THE INVENTION

Field of the Invention

The present invention relates to a portable terminal device capable of identifying an image processing device that a user wishes to use from among a plurality of image processing devices such as multi-functional digital combined machines referred to as multi function peripherals (MFPs), a communication system including the portable terminal device and the plurality of image processing devices, and a communication method and a communication program carried out in the system.

Description of the Related Art

A technique has been already known in which the portable terminal device including a smartphone, a tablet terminal, and the like and the image processing device such as the aforementioned MFP are mutually connected using a wireless local area network (LAN), Bluetooth (registered trademark), or another wireless communication unit, where an action instruction such as printing output is given to a certain image processing device from the portable terminal device. In this case, an image processing device to which the action instruction is given needs to be selected from a list of a plurality of communicable image processing devices displayed on the portable terminal device.

In recent years, a technique that simplifies operation for selecting the image processing device has been employed in such a manner that a user of the portable terminal device touches his/her portable terminal device on an image processing device (brings his/her portable terminal device closer to an image processing device) to which the user wishes to give the action instruction among the plurality of image processing devices as described above.

Meanwhile, JP 2011-120144 A has proposed a technique that detects the strength of a wireless communication radio wave to identify the image processing device, thereby simplifying the selection of the image processing device.

In the technique disclosed in JP 2011-120144 A described above, however, the image processing device with the maximum strength of radio wave is selected. Accordingly, in such a situation that there are several image processing devices closely arranged to each other and a user approaches the image processing devices from a distance, there is a problem in that a different image processing device than the image processing device that the user wishes to use is selected in some cases, forcing the user to reselect the appropriate image processing device in this case.

For example, in a situation where two image processing devices are installed side by side, when the two image processing devices are located at substantially the same distances from the user, the image processing device that the user intends to use does not always match the image processing device with the maximum strength of radio wave.

In addition, the image processing device closer to the user typically has a larger strength of radio wave. However, it is difficult in many cases to walk straight to the image processing device that the user wishes to use in an office or the like because of a layout of desks and partitions and accordingly, the image processing device with a large strength of radio wave, which is positioned closest to the user is not every time the image processing device that the user intends to use.

SUMMARY OF THE INVENTION

The invention has been made in consideration of such a technical background and an object thereof is to provide a portable terminal device, a communication system, a communication method, and a communication program capable of accurately identifying an image processing device in a case where the portable terminal device detects the strength of a radio wave from the image processing device to identify the image processing device that a user intends to use.

The above problem is solved by the following means.

(1) To achieve the abovementionedobject, according to an aspect, a portable terminal device reflecting one aspect of the present invention comprises: a receiving unit that receives an action instruction in a predetermined action mode given by a user for one image processing device among a plurality of image processing devices capable of wirelessly communicating with the portable terminal device; a radio wave strength detection unit that receives a radio wave for measuring the strength of the radio wave output from each of the image processing devices while the portable terminal device is being moved as the user carrying the portable terminal device is moving, to detect the strength of radio wave of each of the image processing devices; a radio wave strength difference calculation unit that calculates differences in the strengths of radio waves between the image processing device with the maximum strength of radio wave and the other image processing devices among the plurality of image processing devices whose strengths of radio waves detected by the radio wave strength detection unit are equal to or larger than a preset first value; an identification unit that identifies, as the image processing device to which the action instruction received by the receiving unit is given, the image processing device having the maximum strength of radio wave at a timing when any of the differences exceeds a preset second value among the differences in the strengths of radio waves calculated by the radio wave strength difference calculation unit; and an instruction unit that gives the action instruction in the action mode received by the receiving unit to the image processing device identified by the identification unit.

(2) The portable terminal device of Item. 1, preferably further comprising a change amount detection unit that detects a change amount of the strength of radio wave, wherein in a case where the maximum strength of radio wave has the largest change amount detected by the change amount detection unit when compared with the change amounts of the strengths of radio waves of the other image processing devices, the identification unit preferably identifies the image processing device with the maximum strength of radio wave as the image processing device to which the action instruction is given.

(3) The portable terminal device of Item. 1 or 2, wherein the action mode preferably includes at least two of a print mode, a scan mode, and a box save mode that saves data to a box serving as a predetermined storage region, the second value preferably corresponds to each of the action modes such that a largest value is set for the box save mode and smaller values are set for the scan mode and the print mode in this order, and the identification unit preferably uses the second value in accordance with the action mode which is received by the receiving unit to determine a timing when the second value is exceeded.

(4) The portable terminal device of any one of Items. 1 to 3, preferably further comprising a device information acquisition unit that acquires information on whether each of the image processing devices is in a power-saving mode, wherein the second value is preferably set to a smaller value for a case where the image processing device in the power-saving mode is present than a case where the image processing device in the power-saving mode is not present, and the identification unit preferably uses the second value in accordance with the information on whether to be in the power-saving mode which is acquired by the device information acquisition unit, to determine a timing when the second value is exceeded.

(5) The portable terminal device of any one of Items. 1 to 4, preferably further comprising a data amount acquisition unit that acquires an amount of data to be transferred to the image processing device under the action instruction to the image processing device, wherein the plurality of second values are preferably set depending on the amount of data to be transferred such that a smaller value is set for a case where a larger amount of data is transferred than a case where a smaller amount of data is transferred, and the identification unit preferably uses the second value in accordance with the amount of data to be transferred which is acquired by the data amount acquisition unit, to determine a timing when the second value is exceeded.

(6) The portable terminal device of any one of Items. 1 to 5, preferably further comprising a device information acquisition unit that acquires information on whether each of the image processing devices is in use, wherein the second value is preferably set to a larger value for a case where the image processing device in use is present than a case where the image processing device in use is not present, and the identification unit preferably uses the second value in accordance with the information on whether to be in use which is acquired by the device information acquisition unit, to determine a timing when the second value is exceeded.

(7) The portable terminal device of Item. 1 or 2, preferably further comprising a device information acquisition unit that acquires information on whether each of the image processing devices is in the power-saving mode, wherein the instruction unit preferably instructs the image processing device in the power-saving mode to start up and in a case where the image processing device instructed to start up is not identified as the image processing device with the maximum strength of radio wave by the identification unit, instructs the same image processing device to switch to the power-saving mode.

(8) The portable terminal device of Item. 1 or 2, preferably further comprising a device information acquisition unit that acquires information on whether each of the image processing devices is in use, wherein the radio wave strength difference calculation unit preferably does not calculate the difference in the strengths of radio waves for the image processing device in use.

(9) The portable terminal device of Item. 8, wherein the radio wave strength difference calculation unit preferably calculates the difference in the strengths of radio waves for the image processing device with the strength of radio wave equal to or larger than the first value but smaller than the second value larger than the first value even while the image processing device is in use.

(10) The portable terminal device of Item. 8 or 9, wherein the device information acquisition unit of the portable terminal device preferably further acquires information on the action mode used in the image processing device in use, and in a case where the action mode in use does not match the action mode received at the receiving unit of the portable terminal device, the radio wave strength difference calculation unit preferably calculates the difference in the strengths of radio waves for the image processing device in use.

(11) The portable terminal device of Item. 8, wherein the radio wave strength difference calculation unit preferably restarts to calculate the difference in the strengths of radio waves for the image processing device in use at a time point when a service of that image processing device is finished.

(12) The portable terminal device of Item. 8 or 9, wherein the device information acquisition unit of the portable terminal device preferably further acquires information on an action completion ratio of the image processing device in use, and the radio wave strength difference calculation unit preferably calculates the difference in the strengths of radio waves for the image processing device with the action completion ratio equal to or larger than a predetermined value.

(13) The portable terminal device of Item. 1 or 2, preferably further comprising a user detection unit that detects the presence of a user operating each of the image processing devices, wherein in a case where an action received by the receiving unit is an action that changes display content of a display unit of the image processing device, the radio wave strength difference calculation unit preferably does not calculate the difference in the strengths of radio waves for the image processing device for which the user detection unit detects that a user operating that image processing device is present.

(14) The portable terminal device of Item. 1 or 2, preferably further comprising: a device information acquisition unit that acquires information on whether each of the image processing devices is in use; and a user detection unit that detects the presence of a user operating each of the image processing devices, wherein in a case where the image processing device is not in use but the presence of a user of that image processing device is detected, the radio wave strength difference calculation unit does not calculate the difference in the strengths of radio waves for that image processing device, and at a time point when the presence of the user is no longer detected, calculates the difference in the strengths of radio waves again for that image processing device.

(15) To achieve the abovementioned object, according to an aspect, a communication system reflecting one aspect of the present invention comprises: a portable terminal device; and a plurality of image processing devices capable of wirelessly communicating with the portable terminal device, wherein the image processing device includes: an execution unit that executes an action in an action mode for which an instruction is given from the portable terminal device; and a radio wave output unit that outputs a radio wave for measuring the strength of the radio wave, the portable terminal device includes: a receiving unit that receives an action instruction in a predetermined action mode given by a user for one image processing device among the plurality of image processing devices; a radio wave strength detection unit that receives the radio wave for measuring the strength of the radio wave output from each of the image processing devices while the portable terminal device is being moved as the user carrying the portable terminal device is moving, to detect the strength of radio wave of each of the image processing devices; a radio wave strength difference calculation unit that calculates differences in the strengths of radio waves between the image processing device with the maximum strength of radio wave and the other image processing devices among the plurality of image processing devices whose strengths of radio waves detected by the radio wave strength detection unit are equal to or larger than a preset first value; an identification unit that identifies, as the image processing device to which the action instruction received by the receiving unit is given, the image processing device having the maximum strength of radio wave at a timing when any of the differences exceeds a preset second value among the differences in the strengths of radio waves calculated by the radio wave strength difference calculation unit; and an instruction unit that gives the action instruction in the action mode received by the receiving unit to the image processing device identified by the identification unit.

(16) To achieve the abovementioned object, according to an aspect, a communication method carried out in a communication system reflecting one aspect of the present invention comprises a portable terminal device and a plurality of image processing devices capable of wirelessly communicating with the portable terminal device, wherein the image processing device carries out: an execution process of executing action in an action mode for which an instruction is given from the portable terminal device; and a radio wave output process of outputting a radio wave for measuring the strength of the radio wave, the portable terminal device carries out: a receiving process of receiving an action instruction in a predetermined action mode given by a user for one image processing device among the plurality of image processing devices; a radio wave strength detection process of receiving the radio wave for measuring the strength of the radio wave output from each of the image processing devices while the portable terminal device is being moved as the user carrying the portable terminal device is moving, to detect the strength of radio wave of each of the image processing devices; a radio wave strength difference calculation process of calculating differences in the strengths of radio waves between the image processing device with the maximum strength of radio wave and the other image processing devices among the plurality of image processing devices whose strengths of radio waves detected through the radio wave strength detection process are equal to or larger than a preset first value; an identification process of identifying, as the image processing device to which the action instruction received through the receiving process is given, the image processing device having the maximum strength of radio wave at a timing when any of the differences exceeds a preset second value among the differences in the strengths of radio waves calculated through the radio wave strength difference calculation process; and an instruction process of giving the action instruction in the action mode received through the receiving process to the image processing device identified through the identification process.

(17) To achieve the abovementioned object, according to an aspect, a non-transitory recording medium storing a computer readable communication program reflecting one aspect of the present invention causes a computer of a portable terminal device carried by a user and capable of being moved as the user is moving to carry out: a receiving process of receiving an action instruction in a predetermined action mode from the user for one image processing device among a plurality of image processing devices capable of wirelessly communicating with the portable terminal device; a radio wave strength detection process of receiving a radio wave for measuring the strength of the radio wave output from the image processing device after the action instruction has been received through the receiving process, to detect the strength of radio wave of each of the image processing devices; a radio wave strength difference calculation process of calculating differences in the strengths of radio waves between the image processing device with the maximum strength of radio wave and the other image processing devices among the plurality of image processing devices whose strengths of radio waves detected through the radio wave strength detection process are equal to or larger than a preset first value; an identification process of identifying, as the image processing device to which the action instruction received through the receiving process is given, the image processing device having the maximum strength of radio wave at a timing when any of the differences exceeds a preset second value among the differences in the strengths of radio waves calculated through the radio wave strength difference calculation process; and an instruction process of giving the action instruction in the action mode received through the receiving process to the image processing device identified through the identification process.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
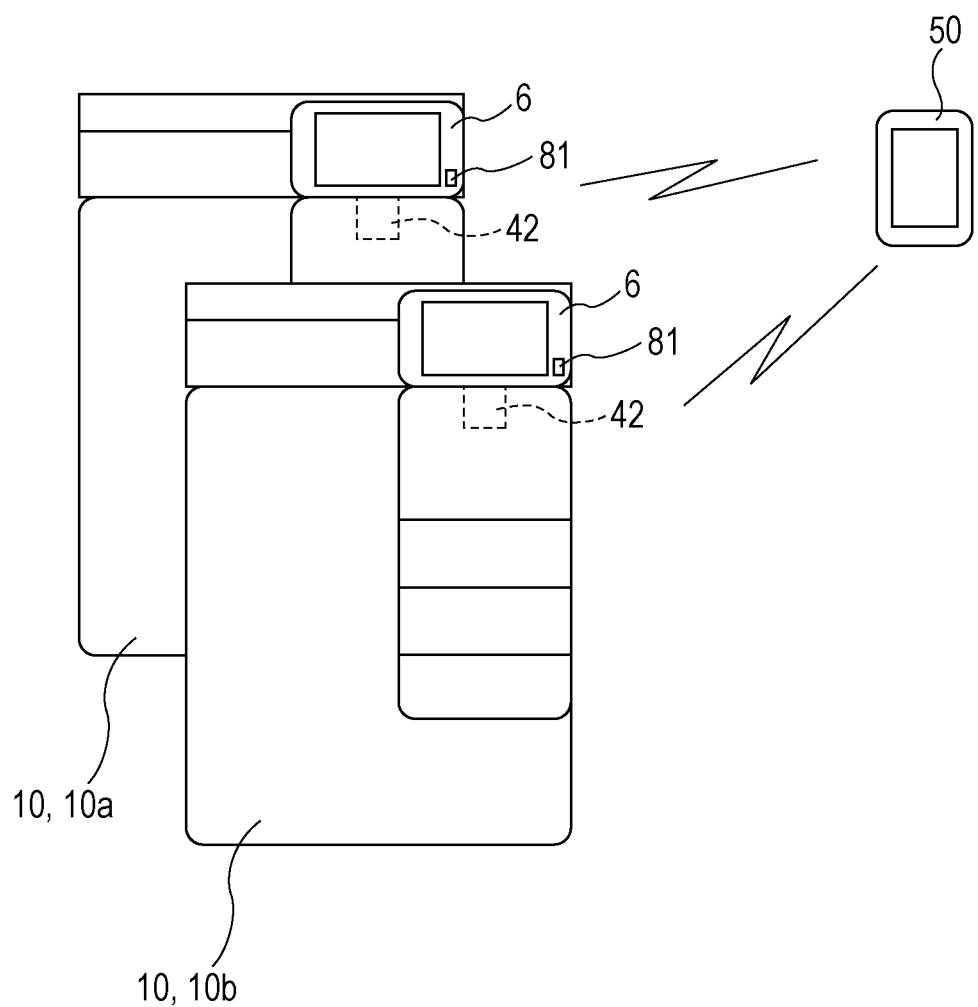
FIG. 1 is a configuration diagram of a communication system according to an embodiment of the present invention.

FIG. 1 is a configuration diagram of a communication system according to an embodiment of the present invention. As illustrated in FIG. 1, the communication system includes a plurality of image processing devices 10a and 10b and one portable terminal device (hereinafter, also referred to as portable terminal) 50, where the image processing devices 10a and 10b and the portable terminal 50 are wirelessly interconnected using various types of wireless communication techniques. For example, short-range wireless communication is used as the wireless communication technique. In the embodiment, communication based on the Bluetooth (registered trademark) low energy (BLE) is used as the short-range wireless communication and, for example, proximity determination processing of the portable terminal 50 to the image processing devices 10a and 10b is carried out.

Figure 2:
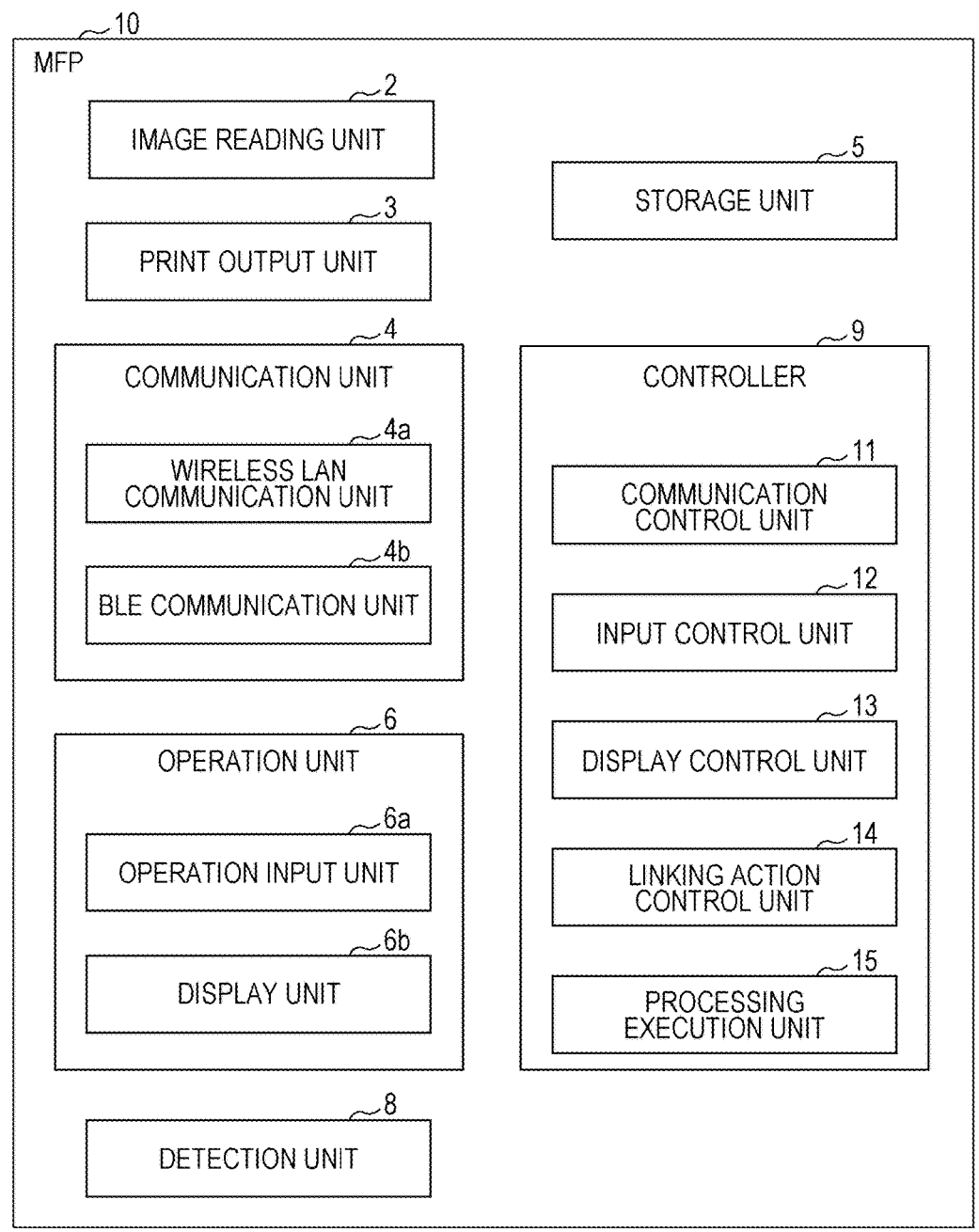
FIG. 2 is a block diagram illustrating a function configuration of an image processing device.

FIG. 2 is a block diagram illustrating a function configuration of the image processing devices 10a and 10b. Note that the image processing devices 10a and 10b are expressed as the image processing device 10 in the following description when it is not particularly necessary to distinguish the one from the other. In addition, the aforementioned MFP serving as a multi-functional digital combined machine with a print function, a scan function, a copy function, a facsimile function, a box storage function, and the like is used as the image processing device in the embodiment. Hereinafter, the image processing device is also referred to as MFP.

As illustrated in FIG. 2, the MFP 10 includes an image reading unit 2, a print output unit 3, a communication unit 4, a storage unit 5, an operation unit 6, a detection unit 8, a controller (control unit) 9, and the like. Various types of functions are realized by these multiple units combined to work together.

The image reading unit 2 is a processor that optically reads (that is, scans) an original document placed on a predetermined position of the MFP 10 to generate image data of that original document (also referred to as document image and scanned image). This image reading unit 2 is also referred to as scanning unit.

The print output unit 3 is an output unit that outputs an image as a print out to various types of media such as paper based on data relating to an object to be printed.

The communication unit 4 is a processor capable of carrying out facsimile communication through a public line or the like. The communication unit 4 is also capable of carrying out various types of wireless communication (including the wireless communication using the BLE, and the like). Specifically, the communication unit 4 includes a wireless LAN communication unit 4a that wirelessly communicates using the wireless LAN (e.g., IEEE 802.11) and a BLE communication unit 4b that wirelessly communicates using the BLE. As illustrated in FIG. 1, the MFP 10 has therein a BLE chip 42 (also referred to as short-range wireless communication chip (or simply, communication chip)) functioning as part or all of the BLE communication unit 4b. The BLE chip 42 is capable of carrying out broadcast transmission (simultaneous multi-destination delivery) of advertising data (transmission data transmitted through broadcasting (also referred to as broadcast transmission data)).

The storage unit 5 is constituted by a storage device such as a hard disk drive (HDD).

The operation unit 6 includes an operation input unit 6a that receives operation input to the MFP 10 and a display unit 6b that outputs various types of information as a display.

The detection unit 8 detects an action state of its own device, for example, whether to be in use, the action mode in use, or whether to be in the power-saving mode or in a normal mode. The detected action state is transmitted to the portable terminal device 50 as device information. The detection unit 8 also detects whether a person is present in front of the MFP 10 through a human detection sensor installed, for example, in the vicinity of the operation unit 6 of the MFP 10 (illustrated in FIG. 1).

The controller (control unit) 9 is a control device built in the MFP 10 to comprehensively control the MFP 10. The controller 9 is configured as a computer system including a CPU, various types of semiconductor memories (a RAM and a ROM), and the like. The controller 9 executes, on the CPU, a predetermined software program (hereinafter, also referred to simply as program) stored within the ROM (e.g., an EEPROM) to realize various types of processors. This program (precisely, a program module group) may be installed in the MFP 10 through a transportable recording medium such as a USB memory, the wireless LAN, or the like.

Specifically, by executing the aforementioned program, the controller 9 realizes the various types of processors including a communication control unit 11, an input control unit 12, a display control unit 13, a linking action control unit 14, and a processing execution unit 15 as illustrated in FIG. 2.

The communication control unit 11 is a processor that controls the communication activity with other devices (e.g., the portable terminal 50) in coordination with the communication unit 4 and the like. The communication control unit 11 includes a transmission control unit that controls the transmission action of various types of data and a reception control unit that controls the reception action of various types of data.

The input control unit 12 is a control unit that controls the operation input action to the operation input unit 6a (e.g., a touch panel). For example, the input control unit 12 controls an action for receiving the operation input to an operation screen displayed on the touch panel (e.g., input for specification from the user).

The display control unit 13 is a processor that controls the display action on the display unit 6b (e.g., the touch panel). The display control unit 13 displays the operation screen for operating the MFP 10 and the like on the touch panel.

The linking action control unit 14 is a processor that controls the linking action with the portable terminal 50 in coordination with the communication unit 4, the communication control unit 11, and the like.

In coordination with the image reading unit 2, the print output unit 3, the communication unit 4, and the like, the processing execution unit 15 carries out processing in the action mode corresponding to the action instruction from the user which is received at the portable terminal 50 and then transmitted from the portable terminal 50.

The portable terminal 50 is a device working in link with the MFP 10, serving as an information input/output terminal device (information terminal) capable of network communication with the MFP 10. A smartphone is exemplified here as the portable terminal 50. Note that, however, the portable terminal 50 is not limited thereto and may be a tablet type terminal or the like.

Figure 3:
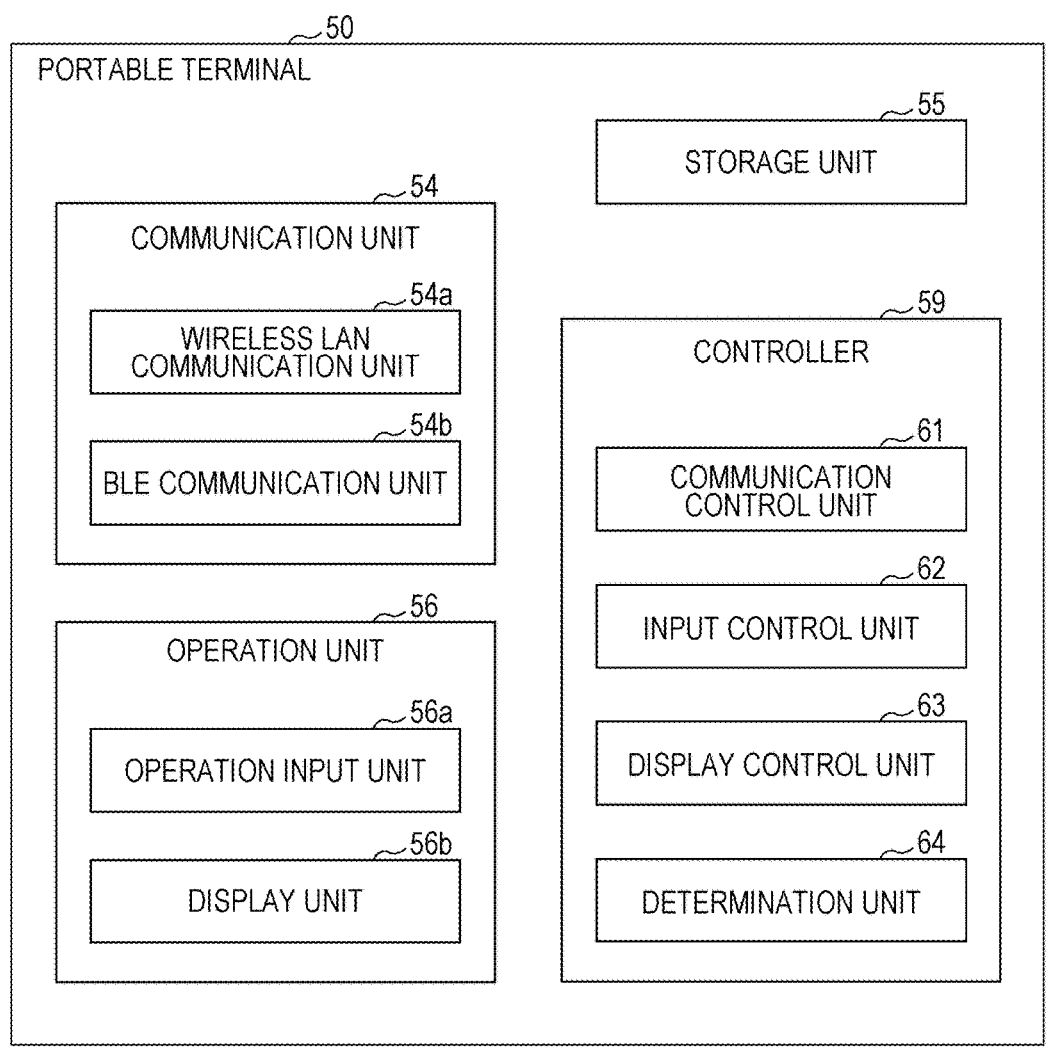
FIG. 3 is a functional block diagram illustrating a schematic configuration of a portable terminal device.

FIG. 3 is a functional block diagram illustrating a schematic configuration of the portable terminal 50. As illustrated in FIG. 3, the portable terminal 50 includes a communication unit 54, a storage unit 55, an operation unit 56, a controller (control unit) 59, and the like. Various types of functions are realized by these multiple units combined to work together.

The communication unit 54 is capable of carrying out various types of wireless communication (including the wireless communication using the BLE, and the like). Specifically, the communication unit 54 includes a wireless LAN communication unit 54a that wirelessly communicates using the wireless LAN (e.g., IEEE 802.11) and a BLE communication unit 54b that wirelessly communicates using the BLE. The BLE communication unit 54b receives the advertising data transmitted through broadcasting from the BLE chip 42 built in the MFP 10, while measuring the strength of that radio wave used for the data transmission.

The storage unit 55 is constituted by a storage device such as a non-volatile semiconductor memory.

The operation unit 56 includes an operation input unit 56a that receives operation input to the portable terminal 50 and a display unit 56b that outputs various types of information as a display. This portable terminal 50 is provided with a touch panel constituted by a liquid crystal display panel in which various types of sensors and the like are built. This touch panel functions as part of the operation input unit 56a and also functions as part of the display unit 56b.

The controller (control unit) 59 is a control device built in the portable terminal 50 to comprehensively control the portable terminal 50. The controller 59 is configured as a computer system including a CPU, various types of semiconductor memories (a RAM and a ROM), and the like. The controller 59 executes, on the CPU, a predetermined software program (hereinafter, also referred to simply as program) stored within a memory unit (e.g., the semiconductor memory) to realize various types of processors. This program (precisely, a program module group) may be configured so as to be installed in the portable terminal 50 through a transportable recording medium such as a USB memory, the wireless LAN, or the like.

A program for ensuring the linkage with the MFP 10 (linking program) and the like are installed in the portable terminal 50. This linking program is an application software program (also referred to simply as application or the like) that realizes various types of processing including the proximity determination processing to the MFP 10.

Specifically, by executing this linking program and the like, the controller 59 realizes various types of processors including a communication control unit 61, an input control unit 62, a display control unit 63, and a determination unit 64. The communication control unit 61 is a processor that controls the communication activity with the MFP 10 and the like in coordination with the communication unit 54 and the like. The input control unit 62 is a control unit that controls, for example, the operation input action to the operation input unit 56a. The display control unit 63 is a processor that controls the display action on the display unit 56b.

The determination unit 64 is a processor that carries out processing for determining that the portable terminal 50 itself has moved close to the MFP 10 based on the strengths of the radio waves from the respective MFPs 10 (proximity determination processing), and also a processor that determines, through calculation, differences in the strengths of radio waves (differences in distances) between the MFP 10 with the maximum strength of radio wave and the other MFPs 10. The determination unit 64 also determines, for example, the action state of the MFP 10 based on the device information contained in the advertising data from the MFP 10 and determines whether a person is present in front of the MFP 10.

The controller 59 controls the linking action with the MFP 10 using these various types of processors and the like.

Next, the action of the communication system illustrated in FIG. 1 will be described. The MFP 10 sends the advertising data containing the device information of the MFP 10 to the portable terminal 50 through the BLE communication. The portable terminal 50 receives the advertising data from the MFP 10 and at the same time measures the strength of the radio wave for the BLE communication to determine the proximity to the MFP 10.

Figure 4:
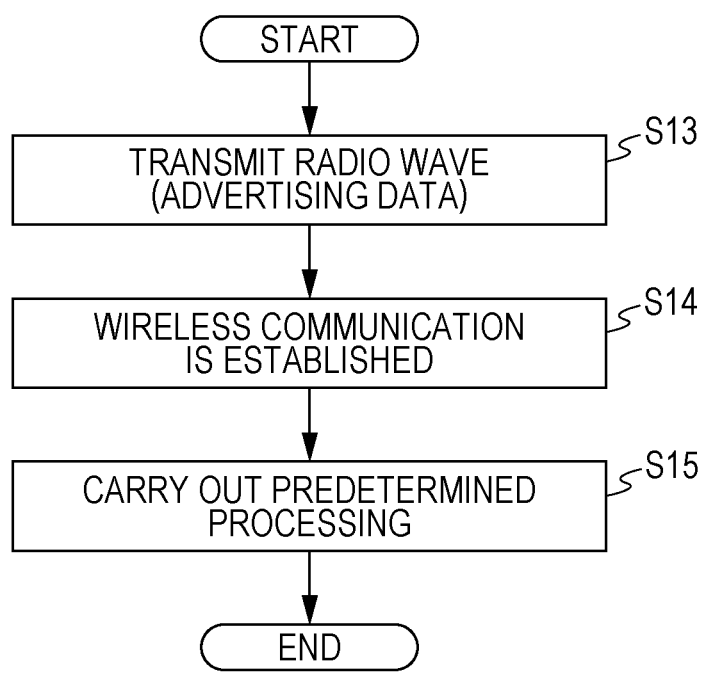
FIG. 4 is a flowchart illustrating the action of the image processing device.

FIG. 4 is a flowchart illustrating the action of the MFP 10. The action of the MFP 10 will be described with reference to FIG. 4 and so on.

The MFP 10 (precisely, the BLE chip 42 built in the MFP 10) constantly sends the radio wave for the BLE communication (a radio wave mainly reaching a peripheral region of the MFP 10 (e.g., within several meters)) at micro time intervals. More precisely, this BLE chip 42 transmits the advertising data through broadcasting.

This advertising data contains identification information (e.g., a device ID) of the MFP 10. The advertising data also contains the device information such as whether the MFP is working in a standby state, in the power-saving mode, or in use, an action completion ratio in the case of being in use, and whether a person is present in front of the MFP 10.

When starting to work, the MFP 10 transmits the advertising data through broadcasting (step S13). Once it is determined through detection processing for the strength of radio wave on the portable terminal side described later that the portable terminal 50 has moved close to the MFP 10, the wireless communication using the BLE communication is established between the MFP 10 and the portable terminal 50 (step S14).

After the BLE communication is established between the MFP 10 and the portable terminal 50, the MFP 10 transmits various types of information such as an IP address of the own device (MFP 10) to the portable terminal 50 through the BLE communication. The portable terminal 50 acquires the various types of information such as the IP address of this MFP 10 to establish the communication using the wireless LAN between the MFP 10 and the portable terminal 50 based on that IP address and the like. Subsequently, various types of data necessary for processing that the user requests are mutually transferred therebetween through the wireless LAN and then the processing is carried out in the requested action mode (step S15). For example, in a case where the user wishes to print a file to be printed which is stored in the portable terminal 50, print data is transmitted to the MFP 10 from the portable terminal 50 through the wireless LAN and then print processing is carried out for that print data in the MFP 10.

Figure 5:
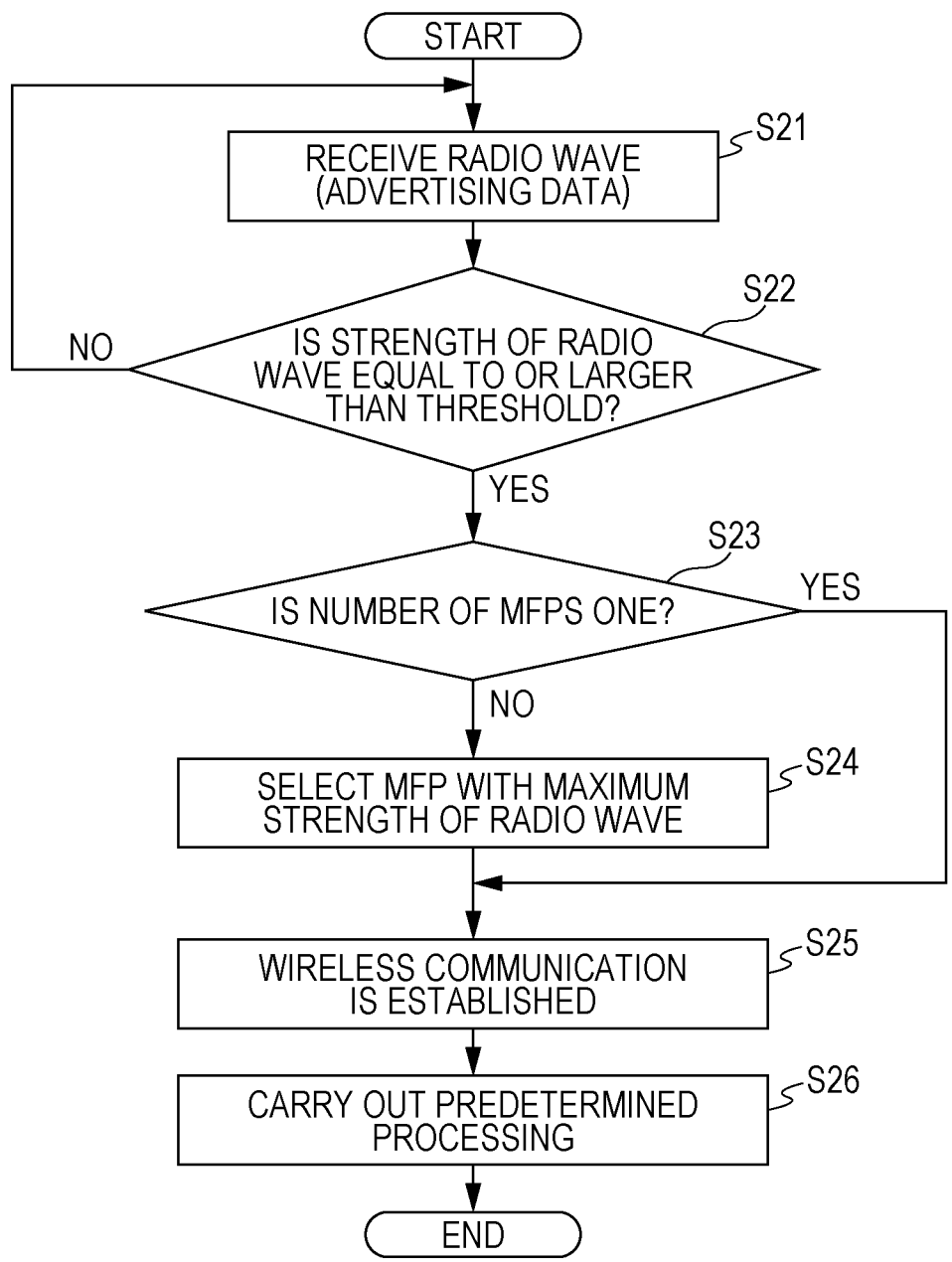
FIG. 5 is a flowchart illustrating a typical action of a portable terminal.

FIG. 5 is a flowchart illustrating a typical action of the portable terminal 50. The action of the portable terminal 50 will be described with reference to FIG. 5 and so on.

The radio wave for the BLE communication from the MFP 10 is received at the portable terminal 50 (step S21). Step S22 determines, as the proximity determination processing, whether the strength of that radio wave from the MFP 10 is no less than a predetermined threshold TH.

Specifically, while receiving the radio wave for the BLE communication from the MFP 10 (step S21), the portable terminal 50 measures the strength of that radio wave from the MFP 10. More specifically, the portable terminal 50 (BLE communication unit 54b) receives the advertising data transmitted through broadcasting from the MFP 10 (BLE chip 42), while measuring the strength of that radio wave used for the data transmission. In addition, the linking program installed in the portable terminal 50 acquires the strength of that radio wave in an active state or in a background action state. The linking program may be configured to also carry out part of the processing for measuring the strength of radio wave.

When the strength of radio wave is smaller than the predetermined threshold TH (step S22: NO), the processing is repeated from step S21. On the other hand, when the strength of radio wave is equal to or larger than the predetermined threshold TH (step S22: YES), it is determined in step S23 whether another MFP 10 with the strength of radio wave equal to or larger than the predetermined threshold TH is present.

When a single MFP 10 has the strength of radio wave equal to or larger than the threshold TH (step S23: YES), processing for establishing the wireless communication with that MFP 10 is carried out in step S25. In step S23, when multiple MFPs 10 have the strengths of radio waves equal to or larger than the threshold TH (step S23: NO), an MFP 10 with the maximum strength of radio wave is selected instep S24 and then the processing for establishing the wireless communication with the selected MFP 10 is carried out in step S25.

After the BLE communication is established between the MFP 10 and the portable terminal 50, the MFP 10 transmits the various types of information such as the IP address of the own device (MFP 10) to the portable terminal 50 through the BLE communication. The portable terminal 50 acquires the various types of information such as the IP address of this MFP 10 to establish the communication using the wireless LAN between the MFP 10 and the portable terminal 50 based on that IP address and the like. Subsequently, various types of data necessary for processing that the user requests are mutually transferred therebetween through the wireless LAN and then the requested processing is carried out (step S26). For example, in a case where the user wishes to print a file to be printed which is stored in the portable terminal 50, print data is transmitted to the MFP 10 from the portable terminal 50 through the wireless LAN and then print processing is carried out for that print data in the MFP 10.

Figure 6:
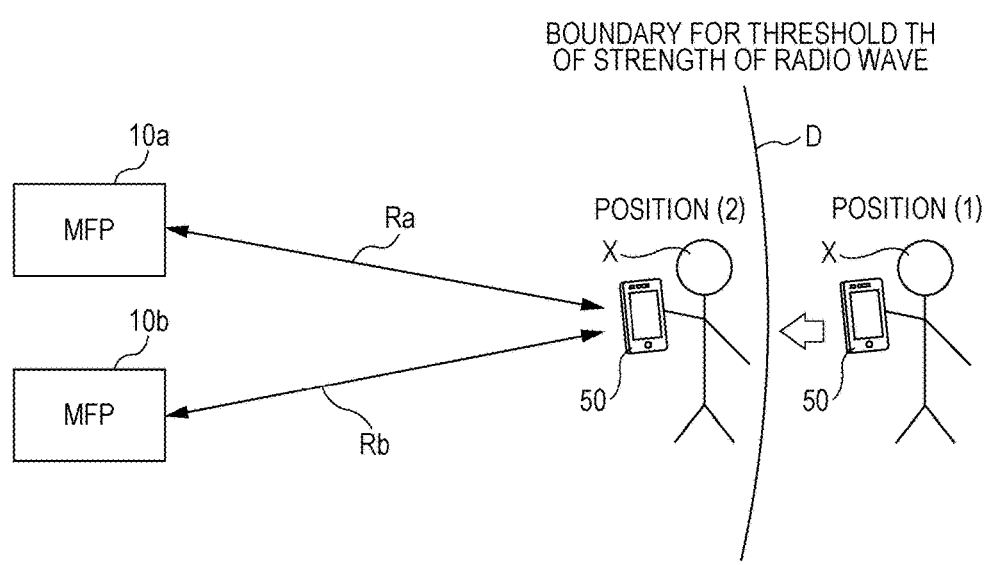
FIG. 6 is a diagram for explaining a problem in linking operation with the image processing device during the processing described in the flowchart in FIG. 5.

FIG. 6 is a diagram for explaining a problem in the linking operation with the MFP 10 during the processing described in the flowchart in FIG. 5. FIG. 6 illustrates an example of a case where two MFPs, namely, the MFP 10a and the MFP 10b are installed side by side and a user X carrying the portable terminal 50 is positioned at substantially the same distances from the respective MFPs 10a and 10b.

When the user X approaches the MFP 10a and the MFP 10b to link with the MFP, the portable terminal 50 confirms the strengths of radio waves of the respective MFPs 10a and 10b.

When the portable terminal 50 is located at a position denoted by (1), the strengths of radio waves of the respective MFPs 10a and 10b do not reach the predetermined threshold TH (first value) and thus the wireless communication with the MFPs 10a and 10b is not yet established. A reference numeral D illustrated in FIG. 6 represents a boundary for the threshold TH of the strength of radio wave.

Thereafter, as the user X passes across the boundary D for the threshold TH of the strength of radio wave and approaches the MFPs 10a and 10b until a position denoted by (2), the strengths of radio waves Ra2 and Rb2 of the MFPs 10a and 10b, respectively, become equal to or larger than the predetermined threshold TH and accordingly the wireless communication is established. At this time, however, the wireless communication is established for one MFP with a larger strength of radio wave among the MFPs 10a and 10b. In a case where the connection is established with a different MFP (for example, the MFP 10b) than an MFP that the user intends to use (for example, the MFP 10a) because the MFPs 10a and 10b are located at similar positions when viewed from the user, such inconvenience is caused that the portable terminal 50 reselects the MFP 10a with which the wireless communication is to be established.

For a solution to this, the processing as described below is carried out in the embodiment.

First Embodiment

Figure 7:
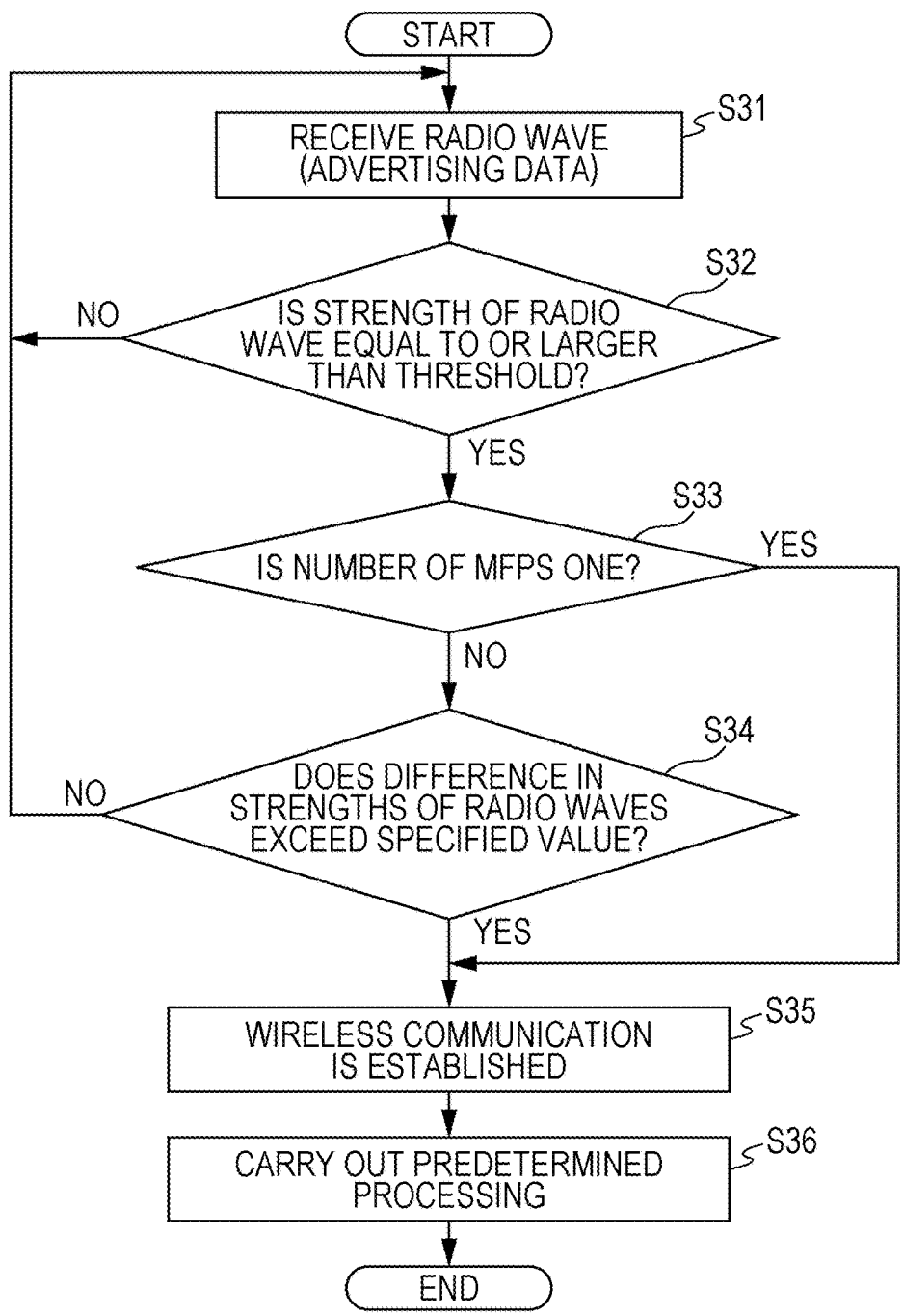
FIG. 7 is a flowchart illustrating the action of a portable terminal device according to a first embodiment.

FIG. 7 is a flowchart illustrating the action of the portable terminal 50. The processing illustrated in FIG. 7 and the following flowcharts is carried out by the CPU in the controller 59 of the portable terminal 50, which works in accordance with an action program stored in the ROM or the like.

The radio wave for the BLE communication (advertising data) output from the MFP 10 is received at the portable terminal 50 in step S31. Step S32 determines, as the proximity determination processing, whether the strength of that radio wave from the MFP 10 is no less than the predetermined threshold TH.

When the strength of the radio wave from the MFP 10 is smaller than the predetermined threshold TH (step S32: NO), the processing is repeated from step S31. On the other hand, when the strength of the radio wave therefrom is equal to or larger than the predetermined threshold TH (step S32: YES), it is determined in step S33 whether the number of the MFPs 10 with the strengths of radio waves equal to or larger than the predetermined threshold TH is one.

When a single MFP has the strength of radio wave equal to or larger than the threshold (step S33: YES), the processing proceeds to step S35 to carryout the processing for establishing the wireless communication with that MFP 10. When multiple MFPs 10 have the strengths of radio waves equal to or larger than the threshold TH (step S33: NO), step S34 calculates differences between the strength of radio wave of the MFP with the maximum strength of radio wave and the strengths of radio waves of the other MFPs to determine whether any of the calculated differences in the strengths of radio waves exceeds a preset specified value (second value).

When any of the differences in the strengths of radio waves exceeds the specified value (step S34: YES), the MFP 10 with the maximum strength of radio wave is identified as the MFP that the user intends to use. Subsequently in step S35, the wireless communication with the identified MFP 10 is established using the BLE communication. In step S34, when the differences in the strengths of radio waves do not exceed the specified value (step S34: NO), the establishment of the wireless communication is not attempted and the processing is repeated from step S31.

Once the BLE communication with the MFP 10 is established, predetermined processing is carried out between the portable terminal 50 and the MFP 10 in step S36. The MFP 10 transmits the various types of information such as the IP address of the own device (MFP 10) to the portable terminal 50 through the BLE communication. The portable terminal 50 acquires the various types of information such as the IP address of this MFP 10 to establish the communication using the wireless LAN between the MFP 10 and the portable terminal 50 based on that IP address and the like. Subsequently, various types of data necessary for processing that the user requests are mutually transferred therebetween through the wireless LAN and then the requested processing is carried out. For example, in a case where the user wishes to print a file to be printed which is stored in the portable terminal 50, print data is transmitted to the MFP 10 from the portable terminal 50 through the wireless LAN and then print processing is carried out for that print data in the MFP 10.

Figure 8A:
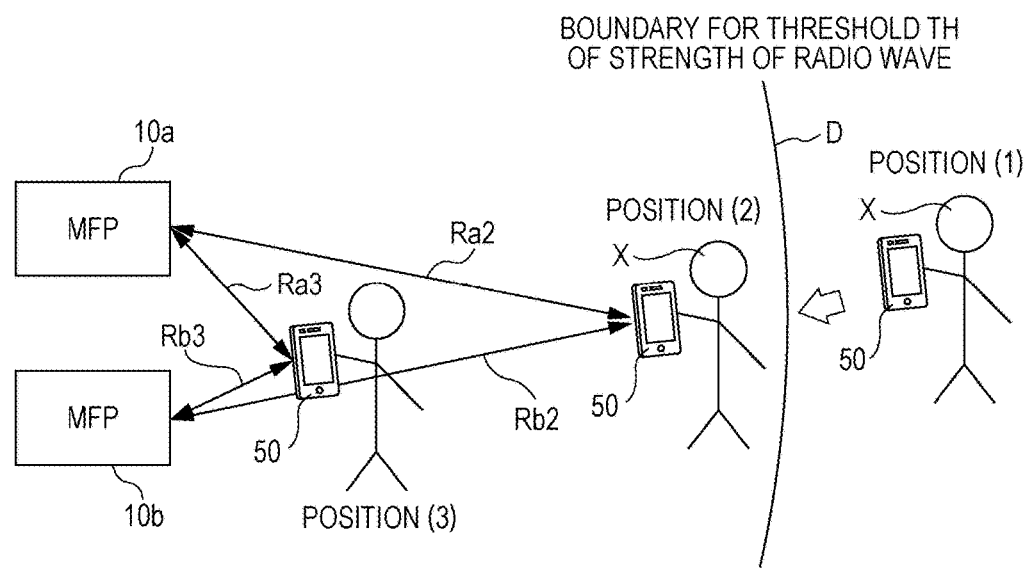
FIGS. 8A and 8B are explanatory diagrams for a case where control in the flowchart described in FIG. 7 is carried out.
Figure 8B:
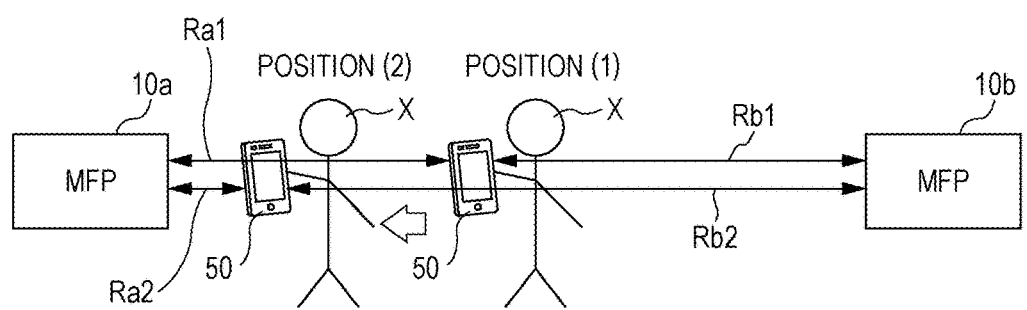

FIGS. 8A and 8B are explanatory diagrams for a case where control in the flowchart described in FIG. 7 is carried out.

As in FIG. 6, FIG. 8A illustrates an example of a case where two MFPs, namely, the MFP 10a and the MFP 10b are installed side by side and the user X positioned at substantially the same distances from the respective MFPs 10a and 10b approaches, for example, the MFP 10b in order to use the MFP 10b.

The portable terminal 50 being carried by the user X individually detects the strengths of radio waves of the MFPs 10a and 10b. When the user X (the portable terminal 50) is located at a position denoted by (1), the strengths of radio waves of the respective MFPs l0a and 10b do not reach the predetermined threshold TH and thus the wireless communication with the MFPs 10a and 10b is not yet established.

Thereafter, as the user X passes across a boundary D for the threshold TH of the strength of radio wave and approaches the MFP 10b until a position denoted by (2), the strengths of radio waves Ra2 and Rb2 of the MFPs 10a and 10b, respectively, become equal to or larger than the predetermined threshold TH. In the conventional technique, the wireless communication is then established for an MFP with a larger strength of radio wave but it is unknown for which MFP the wireless communication is to be established because the distances between the user and the respective MFPs 10a and 10b are still substantially the same. In a case where the MFP 10a has a larger strength of radio wave, there is a possibility of being connected to the MFP 10a that the user does not intend to use.

In the embodiment, compared to this, at the time when the strengths of radio waves Ra2 and Rb2 of the MFPs 10a and 10b, respectively, become equal to or larger than the threshold TH, the difference in the strengths of radio waves between an MFP 10 with a larger strength of radio wave and the other MFP 10 is calculated. The establishment of the wireless communication is not attempted as long as the calculated difference does not exceed the predetermined specified value. Although both of the strengths of radio waves Ra2 and Rb2 are equal to or larger than the threshold TH at the position denoted by (2), there is little difference in the strengths of radio waves between the MFPs 10a and 10b because the distances between the respective MFPs 10a and 10b and the user are substantially the same. Accordingly, the difference in the strengths of radio waves does not exceed the specified value. As a result, the establishment of the wireless communication is not attempted at this position.

As the user X further approaches the MFP 10b that the user X intends to use and reaches a position denoted by (3), the distance between the MFP 10b and the user X becomes smaller than the distance between the MFP 10a and the user X and thus the difference between the strength of radio wave Rb3 of the MFP 10b and the strength of radio wave Ra3 of the MFP 10a (Rb3−Ra3) becomes larger. Once this difference exceeds the specified value, the wireless communication with the MFP 10b having a larger strength of radio wave is established.

As it is understood from FIG. 8A, in a case where the MFP 10 for which the wireless communication is to be established is selected solely based on the degree of the strength of radio wave, the user in many cases cannot recognize that MFP when viewing from his/her position. For such a situation, the MFP 10 for which the wireless communication is to be established can be selected at the time point when the user reaches a position at which the user can recognize the MFP 10 more clearly.

FIG. 8B illustrates an example of a case where the MFP 10a and the MFP 10b are installed facing each other and the user X carrying the portable terminal 50 is in a position at substantially the same distances from both of the MFPs 10a and 10b. In this example, the user X is assumed to intend to use the MFP 10a.

Also in this case, the portable terminal 50 detects and confirms the strengths of radio waves of the respective MFPs 10a and 10b in order to link with one of the MFPs. Because the distances between the user X and the respective MFPs 10a and 10b are substantially the same, there is little difference between the strengths of radio waves Ra1 and Rb1 and thus the difference does not exceeds the specified value. Accordingly, the establishment of the wireless communication is not attempted at this position.

As the user X (the portable terminal 50) approaches the MFP 10a and reaches a position denoted by (2), the difference between the strength of radio wave Ra2 of the MFP 10a and the strength of radio wave Rb2 of the MFP 10b becomes larger. Once this difference exceeds the specified value, the wireless communication with the MFP 10a having the maximum strength of radio wave is established.

Also in the example in FIG. 8B, when the MFP 10b is selected to establish the wireless communication therefor solely based on the degree of the strength of radio wave in such a situation that the user X approaches the MFP 10a from a position close to the MFP 10b that the user X does not intend to use, the user in many cases cannot recognize that MFP when viewing from his/her position similarly to the situation in FIG. 8A. For such a case, the MFP 10a can be selected to establish the wireless communication therefor at the time point when the user reaches a position at which the user can recognize the MFP 10 more clearly.

As described thus far, in a case where the MFP 10 and the portable terminal 50 are present within a range of the strength of radio wave equal to or larger than the predetermined threshold TH, the wireless communication is not established immediately but rather the strengths of radio waves are compared between the MFP 10 with the maximum strength of radio wave and the other MFPs 10 which are present within the range, and only when the differences thereamong exceed the specified value defined in advance, the wireless communication is established between the MFP 10 with the maximum strength of radio wave and the portable terminal 50. As a result, in a situation where multiple MFPs are present around the portable terminal 50, the MFP 10 to be linked which the user intends to use can be properly identified.

Second Embodiment

As described in the first embodiment, the differences in the strengths of radio waves of respective MFPs 10 are calculated before the wireless communication is initiated, whereby the MFP 10 that the user wishes to use can be automatically identified from among the multiple MFPs 10. In addition to this, the portable terminal device 50 detects change in the degree of the strength of radio wave of the MFP 10 such that the MFP 10 that the user intends to use can be further accurately identified.

Figure 9:
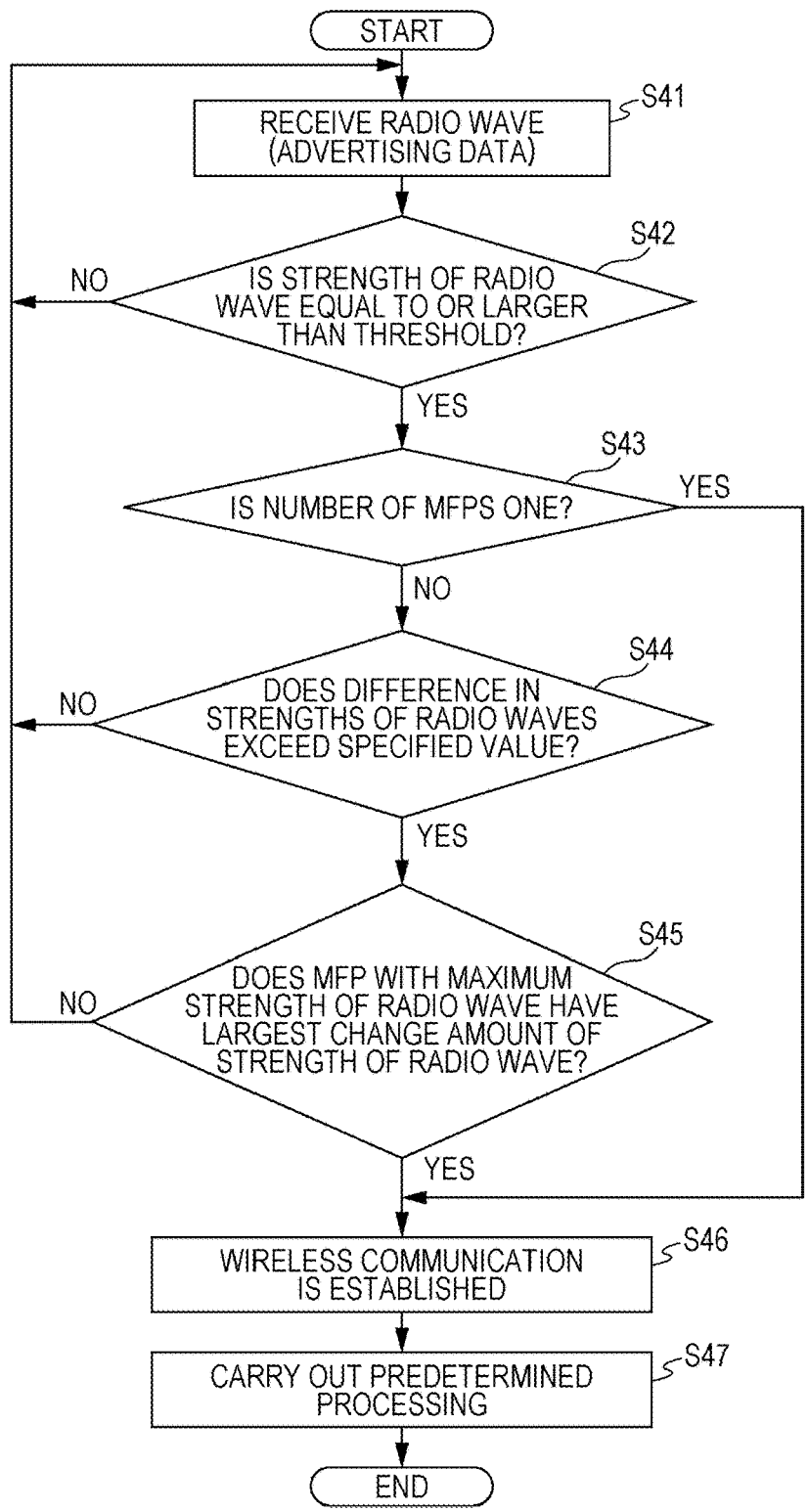
FIG. 9 is a flowchart illustrating the action of a portable terminal device according to a second embodiment.

FIG. 9 is a flowchart illustrating the action of a portable terminal 50 that carries out such processing.

The radio wave for the BLE communication (advertising data) output from an MFP 10 is received at the portable terminal 50 in step S41. Step S42 determines, as the proximity determination processing, whether the strength of that radio wave from the MFP 10 is no less than the predetermined threshold TH.

When the strength of the radio wave from the MFP 10 is smaller than the predetermined threshold TH (step S42: NO), the processing is repeated from step S41. On the other hand, when the strength of the radio wave therefrom is equal to or larger than the predetermined threshold TH (step S42: YES), it is determined in step S43 whether the number of the MFPs 10 with the strengths of radio waves equal to or larger than the predetermined threshold TH is one.

When a single MFP has the strength of radio wave equal to or larger than the threshold TH (step S43: YES), the processing proceeds to step S46 to carryout the processing for establishing the wireless communication with that MFP 10. When multiple MFPs 10 have the strengths of radio waves equal to or larger than the threshold TH (step S43: NO), step S44 calculates differences between the strength of radio wave of the MFP with the maximum strength of radio wave and the strengths of radio waves of the other MFPs to determine whether any of the calculated differences in the strengths of radio waves exceeds a preset specified value (second value).

When the differences in the strengths of radio waves do not exceed the specified value (step S44: NO), the processing returns to step S41 to be repeated from step S41. When any of the differences in the strengths of radio waves exceeds the specified value (step S44: YES), step S45 determines whether, among the MFPs 10 whose strengths of radio waves are compared in step S44, the MFP 10 with the maximum strength of radio wave has the largest change amount of the strength of radio wave when compared with the other MFPs 10. When the MFP 10 with the maximum strength of radio wave does not have the largest change amount of the strength of radio wave (step S45: NO), the establishment of the wireless communication is not attempted and the processing returns to step S41 to be repeated from step S41. When the MFP 10 with the maximum strength of radio wave has the largest change amount of the strength of radio wave (step S45: YES), this MFP 10 with the largest change amount of the strength of radio wave is identified as the MFP that the user intends to use. Subsequently in step S46, the wireless communication with the identified MFP 10 is established using the BLE communication.

Once the BLE communication with the MFP 10 is established, predetermined processing is carried out between the portable terminal 50 and the MFP 10 in step S47. The MFP 10 transmits the various types of information such as the IP address of the own device (MFP 10) to the portable terminal 50 through the BLE communication. The portable terminal 50 acquires the various types of information such as the IP address of this MFP 10 to establish the communication using the wireless LAN between the MFP 10 and the portable terminal 50 based on that IP address and the like. Subsequently, various types of data necessary for processing that the user requests are mutually transferred therebetween through the wireless LAN and then the requested processing is carried out. For example, in a case where the user wishes to print a file to be printed which is stored in the portable terminal 50, print data is transmitted to the MFP 10 from the portable terminal 50 through the wireless LAN and then print processing is carried out for that print data in the MFP 10.

Figure 10:
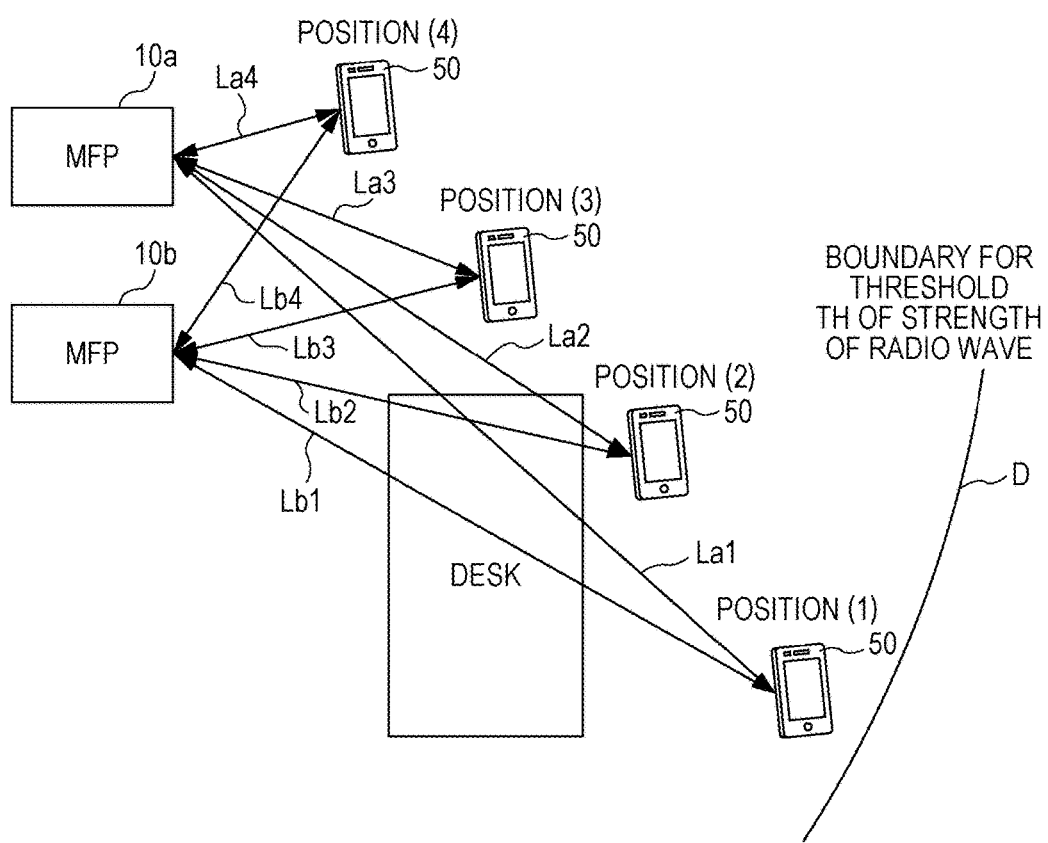
FIG. 10 is an explanatory diagram for a case where control in the flowchart described in FIG. 9 is carried out.

FIG. 10 is an explanatory diagram for a case where control in the flowchart described in FIG. 9 is carried out.

An example of control is used therein in which two MFPs, namely, the MFP 10*a* and the MFP 10*b* are installed side by side as in the case illustrated in FIG. 6 but there is an obstacle such as a desk between the MFP 10*b* and the user and thus the user moves closer toward the MFP 10*a* with no obstacle therebetween to link therewith.

As the user is walking toward the MFP 10*a* to link with the MFP 10*a*, the strengths of radio waves of the MFPs 10*a* and 10*b* become equal to or larger than the threshold TH at a point denoted by (1) for the first time and thus a difference in the strengths of radio waves between the MFP 10*a* and the MFP 10*b* is calculated. At this point, the MFP 10*b* is positioned closer to the portable terminal 50 than the MFP 10*a* and accordingly the difference in the strengths of radio waves is also large. In the first embodiment described in FIG. 7 and FIGS. 8A and 8B, in a case where this difference is over the specified value, the communication is established for the MFP 10*b* at the time point indicated by (1). However, the MFP 10*b* differs from the MFP 10*a* that the user intends to use.

Here, according to the control illustrated in the flowchart in FIG. 9, in addition to the difference in the strengths of radio waves in step S44, having the largest change in the strength of radio wave in step S45 also acts as a condition for establishing the communication. Therefore, the establishment of communication is deferred at the point denoted by (1) because data for the change amount of the strength of radio wave is not yet obtained.

Next, when the user (portable terminal 50) reaches a point denoted by (2), the MFP 10*b* is positioned closer to the portable terminal 50 than the MFP 10*a* similarly to the state at the point denoted by (1) and accordingly the difference in the strengths of radio waves is large as well. This difference is assumed to exceed the specified value. However, a change amount in distance from a distance La1 between the MFP 10*a* and the portable terminal 50 at the position denoted by (1) to a distance La2 between the MFP 10*a* and the portable terminal 50 at the position denoted by (2) is larger than a change amount in distance from a distance Lb1 between the MFP 10*b* and the portable terminal 50 at the position denoted by (1) to a distance Lb2 between the MFP 10*b* and the portable terminal 50 at the position denoted by (2). Accordingly, as for the change amount of the strength of radio wave when the portable terminal 50 moves from the position denoted by (1) to the position denoted by (2), a change amount of the strength of radio wave of the MFP 10*a* is also larger than a change amount of the strength of radio wave of the MFP 10*b*.

As a result, in the determination in step S45 in FIG. 9, the condition that the MFP 10*b* with the maximum strength of radio wave has the largest change amount of the strength of radio wave when compared with the change amount of the strength of radio wave of the other MFP, specifically, the MFP 10*a* is not satisfied and thus the establishment of communication with the MFP 10*b* is deferred again at this point.

Additionally, when the portable terminal 50 reaches a point denoted by (3), the distances between the portable terminal 50 and the respective MFPs 10*a* and 10*b* are similar in degree and the difference in the strengths of radio waves is not as large as the level exceeding the specified value. Accordingly, both of the MFPs 10*a* and 10*b* do not satisfy the condition for establishing the wireless communication.

Furthermore, when reaching a point denoted by (4), the portable terminal 50 approaches the MFP 10*a* to a great extent and thus the difference in the strengths of radio waves exceeding the specified value is generated in the MFPs as well. At the same time, in regard to the change amount of the strength of radio wave, the MFP 10*b* indicates little change from a distance Lb3 between the MFP 10*b* and the portable terminal 50 at the point denoted by (3) to a distance Lb4 between the MFP 10*b* and the portable terminal 50 at a point denoted by (4). Therefore, the strength of radio wave is also barely changed. In contrast to this, change from a distance La3 at the point denoted by (3) to a distance La4 at the point denoted by (4) is large for the MFP 10*a* and accordingly the change amount of the strength of radio wave thereof is also larger than that of the MFP 10*b*.

At this time point, the condition for establishing the wireless communication is satisfied and the portable terminal 50 then establishes the wireless communication with the MFP 10*a*.

As described thus far, the condition relating to the change amount of the strength of radio wave is added in the embodiment. Accordingly, in a case where, for example, the user cannot advance straight toward a desired MFP 10 due to a situation of an office environment, inconvenience of identifying an inappropriate MFP can be prevented which is caused when the MFP 10 is identified solely based on a condition that the difference in the strengths of radio waves is large between the MFP 10*a* and the MFP 10*b*. As a result, the MFP 10 that the user intends to use can be properly identified.

Third Embodiment

The first embodiment illustrated in FIG. 7 and FIGS. 8A and 8B has established the wireless communication under the condition that the difference in the strengths of radio waves between the respective MFPs 10 exceeds the predetermined specified value. In some cases, however, depending on the action mode used for linking with the MFP 10, the wireless communication is required to be carried out from a remote distance as much as possible.

For a solution to this situation, the third embodiment is configured to control the specified value for the difference in the strengths of radio waves to change depending on the action mode received at a portable terminal 50. This control will be described with reference to a flowchart in FIG. 11.

The radio wave for the BLE communication (advertising data) output from an MFP 10 is received at the portable terminal 50 in step S51. Step S52 determines, as the proximity determination processing, whether the strength of that radio wave from the MFP 10 is no less than the predetermined threshold TH.

When the strength of the radio wave from the MFP 10 is smaller than the predetermined threshold TH (step S52: NO), the processing is repeated from step S51. On the other hand, when the strength of the radio wave therefrom is equal to or larger than the predetermined threshold TH (step S52: YES), it is determined in step S53 whether the number of the MFPs 10 with the strengths of radio waves equal to or larger than the predetermined threshold TH is one.

When a single MFP has the strength of radio wave equal to or larger than the threshold (step S53: YES), the processing proceeds to step S60 to carryout the processing for establishing the wireless communication with that MFP 10. When multiple MFPs 10 have the strengths of radio waves equal to or larger than the threshold TH (step S53: NO), the processing proceeds to step S54.

Step S54 and subsequent steps confirm the action mode used for linking with MFP 10 which is set by the user at the portable terminal 50, to set the specified value for the difference in the strengths of radio waves depending on the action mode. Specifically, step S54 first confirms whether the action mode is a print mode. When the action mode is the print mode (step S54: YES), a specified value for the print mode is set as the specified value in step S56 and thereafter the processing proceeds to step S59. The specified value for the difference in the strengths of radio waves in accordance with the action mode is set in advance and stored in the storage unit 55 of the portable terminal 50 or the like.

In step S54, when the action mode is not the print mode (step S54: NO), step S55 confirms whether the action mode is a scan mode. When the action mode is the scan mode (step S55: YES), a specified value for the difference in the strengths of radio waves for the scan mode is set in step S57 and thereafter the processing proceeds to step S59. In step S55, when the action mode is not the scan mode (step S55: NO), a specified value for a box save mode that saves data to a box serving as a predetermined storage region is set in step S58 and thereafter the processing proceeds to step S59.

After the specified value for the difference in the strengths of radio waves corresponding to the action mode that the user intends to use is set in this manner, step S59 calculates differences between the strength of radio wave of the MFP 10 with the maximum strength of radio wave and the strengths of radio waves of the other MFPs 10 to determine whether the calculated differences in the strengths of radio waves exceed the specified value set depending on the action mode. When the differences in the strengths of radio waves do not exceed the specified value (step S59: NO), the establishment of the wireless communication is not attempted and the processing returns to step S51 to be repeated from step S51. When any of the differences in the strengths of radio waves exceeds the specified value (step S59: YES), the wireless communication using the BLE communication is established between the MFP 10 with the maximum strength of radio wave and the portable terminal 50 in step S60.

Once the BLE communication with the MFP 10 is established, predetermined processing is carried out between the portable terminal 50 and the MFP 10 in step S61. The MFP 10 transmits the various types of information such as the IP address of the own device (MFP 10) to the portable terminal 50 through the BLE communication. The portable terminal 50 acquires the various types of information such as the IP address of this MFP 10 to establish the communication using the wireless LAN between the MFP 10 and the portable terminal 50 based on that IP address and the like. Subsequently, various types of data necessary for processing that the user requests are mutually transferred therebetween through the wireless LAN and then the requested processing is carried out. For example, in a case where the user wishes to print a file to be printed which is stored in the portable terminal 50, print data is transmitted to the MFP 10 from the portable terminal 50 through the wireless LAN and then print processing is carried out for that print data in the MFP 10.

Figure 11:
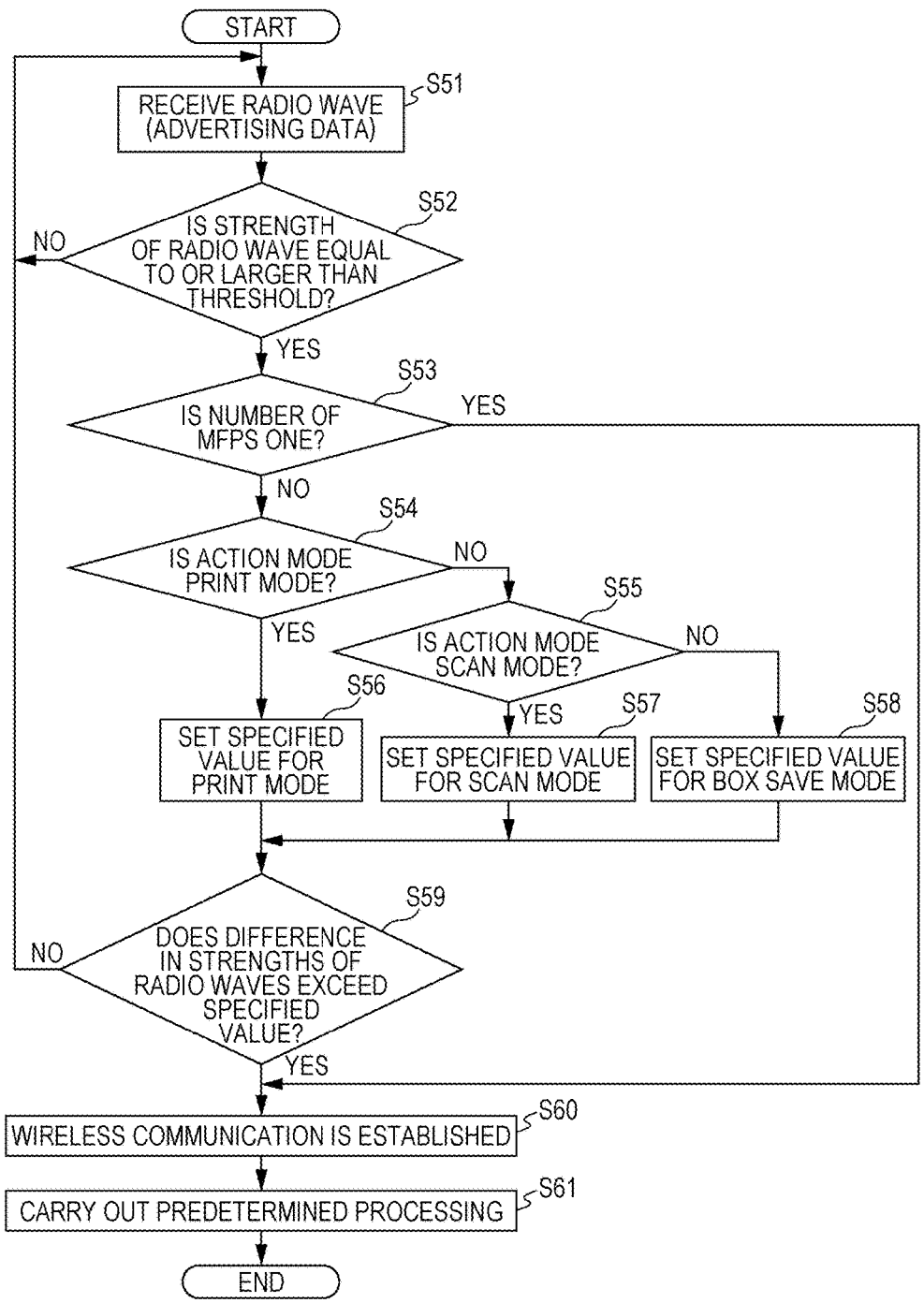
FIG. 11 is a flowchart illustrating the action of a portable terminal device according to a third embodiment.
Figure 12A:
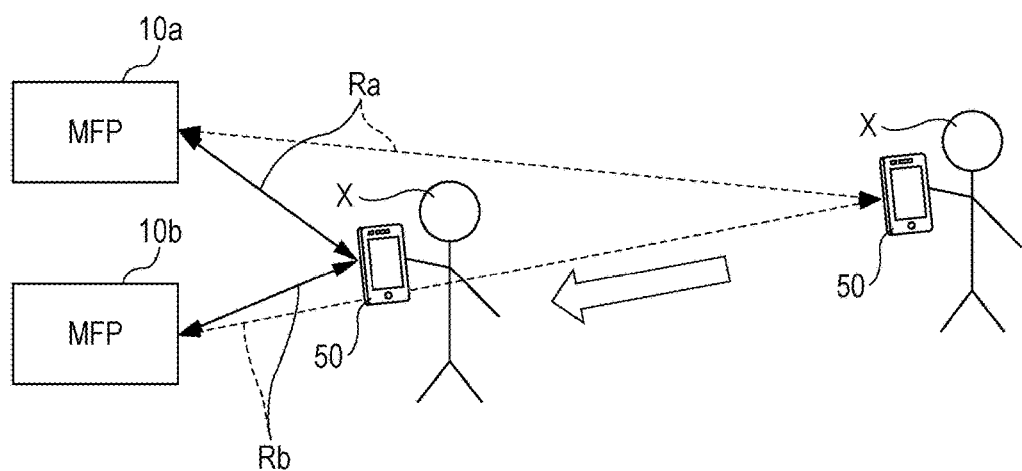
FIGS. 12A and 12B are explanatory diagrams for a case where control in the flowchart described in FIG. 11 is carried out.
Figure 12B:
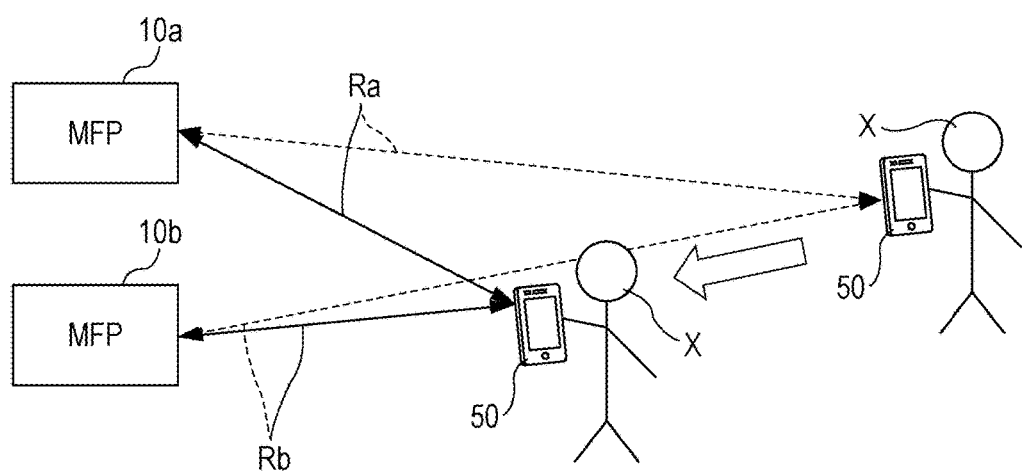

FIGS. 12A and 12B are explanatory diagrams for a case where control in the flowchart described in FIG. 11 is carried out.

As in the case illustrated in FIG. 6, an example is illustrated therein for a case where two MFPs, namely, the MFP 10*a* and the MFP 10*b* are installed side by side and the user X positioned at substantially the same distances from the respective MFPs 10*a* and 10*b* approaches the MFP 10*b* in order to use the MFP 10*b*.

When the user X approaches the MFP 10a and the MFP 10b to use the MFP 10b, the portable terminal 50 confirms the strengths of radio waves of the respective MFPs 10a and 10b.

As the user X (the portable terminal 50) approaches the MFPs 10a and 10b, the strengths of radio waves of the respective MFPs 10a and 10b become equal to or larger than the predetermined threshold TH and thus the difference in the strengths of radio waves is calculated between an MFP with a larger strength of radio wave and the other MFP. Note that the specified value at this time is set depending on the action mode used for linking with the MFP 10b which is received at the portable terminal 50.

In this example, three specified values are prepared for the action modes, namely, the print mode, the scan mode, and the box save mode, where the specified value for the print mode is set to a smallest value of the difference in the strengths of radio waves and the specified value for the scan mode is set to a second smallest value; in contrast to this, the specified value for the box save mode is set to a largest value of the difference in the strengths of radio waves.

These specified values are set based on a time length from a start of the communication between the portable terminal 50 and the MFP 10 until the completion of the action of the MFP 10. In the print mode, it takes time after data transmission to start up an image formation engine of the MFP 10 and thus the specified value is set to a value easily allowing the difference in the strengths of radio waves to exceed the specified value even at a position where the portable terminal 50 and the MFP 10 are located relatively away from each other. Compared to this, in the box save mode, it is not necessary to start up the image formation engine in order to complete the action and thus a relatively large value is set to the specified value for the difference in the strengths of radio waves such that a target MFP 10 is identified more surely.

As described thus far, in the action according to the third embodiment, the specified value for the difference in the strengths of radio waves between the MFP 10a and the MFP 10b is changed depending on the action mode set at the portable terminal 50 for which the instruction is then given to the MFP 10. As a result, convenience for the user is further enhanced while the MFP 10 that the user intends to use can be properly identified.

The embodiment illustrated in FIG. 11 and FIGS. 12A and 12B has described a case where a value of the specified value used for determining the difference in the strengths of radio waves is changed depending on the action mode set at the portable terminal 50 for which the instruction is then given to the MFP 10. However, the specified value for the difference in the strengths of radio waves may be changed depending on a condition other than the action mode.

For example, the specified value for the difference in the strengths of radio waves may be changed based on the action state of the MFP 10 to be linked which the user intends to use or an amount of data to be transferred to the MFP 10 from the portable terminal 50.

In regard to the action state, when the MFP 10 to be linked is in the power-saving mode, a certain time is required after data transmission to switch from a power-saving state to a standby state and thus, as in the case of the aforementioned print mode, the specified value is set to a smaller value for a case where the MFP 10 in the power-saving mode is present than a case where the MFP 10 in the power-saving mode is not present such that the difference in the strengths of radio waves easily exceeds the specified value even at a position where the portable terminal 50 and the MFP 10 are located relatively away from each other.

Alternatively, information on whether the respective MFPs 10 are in use may be acquired such that the second value is set to a larger value for a case where the MFP 10 in use is present than a case where the MFP 10 in use is not present, thereby preventing an unwanted connection between the portable terminal 50 and the MFP 10 in use.

As for the amount of data to be transferred, as in the case of the aforementioned print mode, the specified value is set to a smaller value for a case where a larger amount of data is transferred to the MFP 10 to be linked because a certain time is required to transfer the data than a case where a smaller amount of data is transferred such that the difference in the strengths of radio waves easily exceeds the specified value even at a position where the portable terminal 50 and the MFP 10 are located relatively away from each other. With the control carried out as described above, convenience for the user is further enhanced while the MFP 10 that the user intends to use can be properly identified.

Fourth Embodiment

Next, still another embodiment of the invention will be described with reference to FIG. 13 and FIGS. 14A and 14B. The embodiment is configured such that, when the MFP 10 in the power-saving mode is present, the instruction from the portable terminal 50 forces that MFP 10 to start up. Meanwhile, in a case where it is found that the MFP 10 that has started up is not the MFP that the user intends to use, the instruction from the portable terminal 50 causes that MFP 10 to switch to the power-saving mode again.

Figure 13:
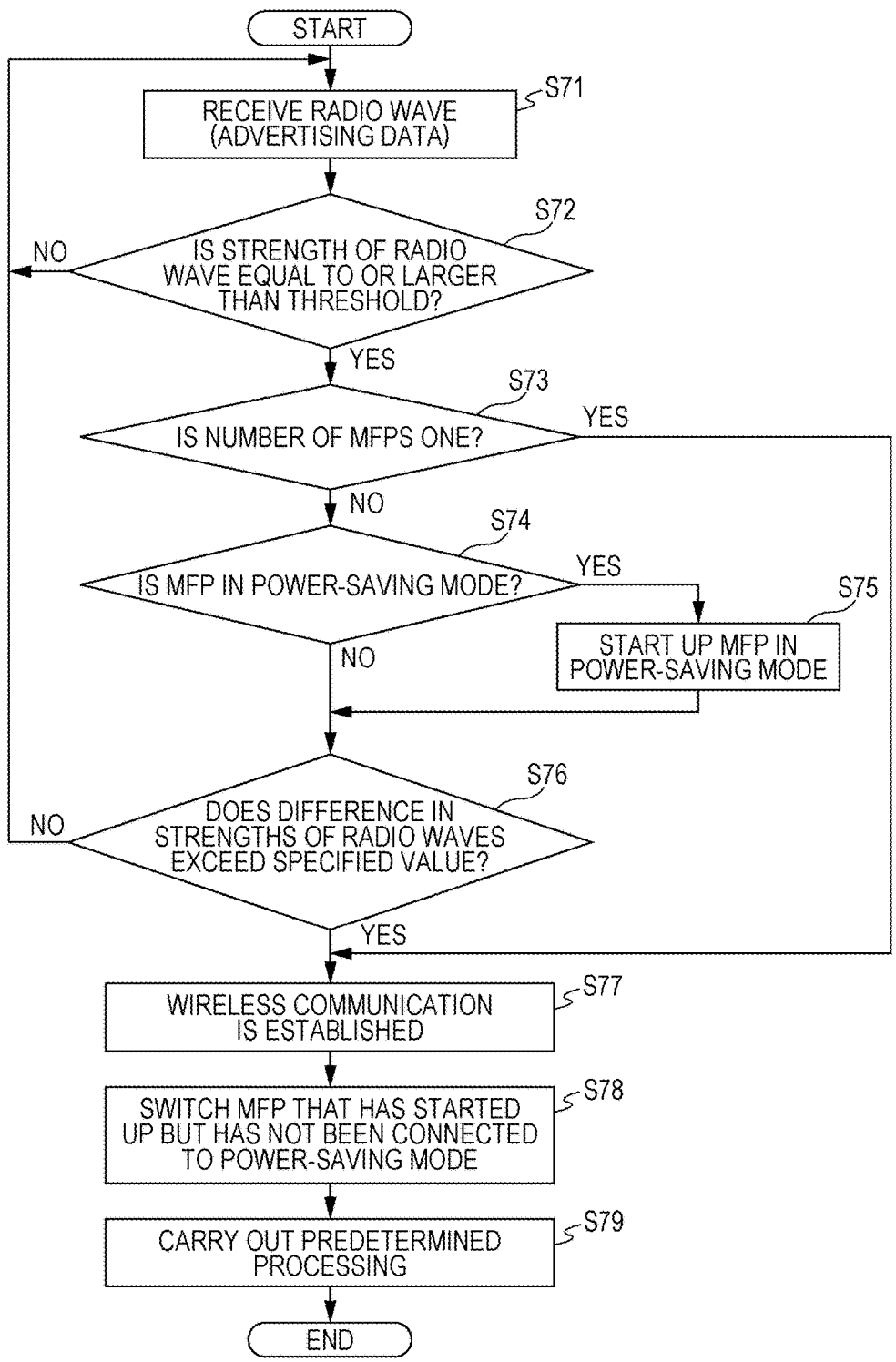
FIG. 13 is a flowchart illustrating the action of a portable terminal device according to a fourth embodiment.

FIG. 13 is a flowchart illustrating the action of the portable terminal 50.

The radio wave for the BLE communication (advertising data) output from an MFP 10 is received at the portable terminal 50 in step S71. Step S72 determines, as the proximity determination processing, whether the strength of that radio wave from the MFP 10 is no less than the predetermined threshold TH.

When the strength of the radio wave from the MFP 10 is smaller than the predetermined threshold TH (step S72: NO), the processing is repeated from step S71. On the other hand, when the strength of the radio wave therefrom is equal to or larger than the predetermined threshold TH (step S72: YES), it is determined in step S73 whether the number of the MFPs 10 with the strengths of radio waves equal to or larger than the predetermined threshold TH is one.

When a single MFP has the strength of radio wave equal to or larger than the threshold (step S73: YES), the processing proceeds to step S77 to carryout the processing for establishing the wireless communication with that MFP 10. When multiple MFPs 10 have the strengths of radio waves equal to or larger than the threshold TH (step S73: NO), the processing proceeds to step S74.

Step S74 extracts, from the advertising data received instep S71, the device information of the MFP 10 with the strength of radio wave equal to or larger than the threshold TH to determine whether each of the MFPs 10 is in the power-saving mode. When the MFP 10 is not in the power-saving mode (step S74: NO), the processing proceeds to step S76. When the MFP 10 is in the power-saving mode (step S74: YES), a startup notification (startup instruction) for forcing that MFP 10 to start up in the normal mode from the power-saving mode is given to that MFP 10 in step S75 to cause that MFP 10 to start up. Thereafter, the processing proceeds to step S76.

Step S76 calculates differences between the strength of radio wave of the MFP with the maximum strength of radio wave and the strengths of radio waves of the other MFPs to determine whether any of the calculated differences in the strengths of radio waves exceeds the preset specified value (second value).

When the differences in the strengths of radio waves do not exceed the specified value (step S76: NO), the establishment of the wireless communication is not attempted and the processing is repeated from step S71. When any of the differences in the strengths of radio waves exceeds the specified value (step S76: YES), the MFP 10 with the maximum strength of radio wave is identified as the MFP that the user intends to use. Subsequently in step S77, the wireless communication with the identified MFP 10 is established using the BLE communication. After the BLE communication is established, the MFP 10 transmits the various types of information such as the IP address of the own device (MFP 10) to the portable terminal 50 through the BLE communication.

In step S78, in a case where such an MFP 10 is present that has been caused to start up from the power-saving mode in step S75 but the communication has not been established therefor, power-saving switchover is notified to that MFP 10 to instruct that MFP 10 to switch to the power-saving mode again.

Once the BLE communication with the MFP 10 is established, predetermined processing is carried out between the portable terminal 50 and the MFP 10 in step S79. The MFP 10 transmits the various types of information such as the IP address of the own device (MFP 10) to the portable terminal 50 through the BLE communication. The portable terminal 50 acquires the various types of information such as the IP address of this MFP 10 to establish the communication using the wireless LAN between the MFP 10 and the portable terminal 50 based on that IP address and the like. Subsequently, various types of data necessary for processing that the user requests are mutually transferred therebetween through the wireless LAN and then the requested processing is carried out. For example, in a case where the user wishes to print a file to be printed which is stored in the portable terminal 50, print data is transmitted to the MFP 10 from the portable terminal 50 through the wireless LAN and then print processing is carried out for that print data in the MFP 10.

Figure 14A:
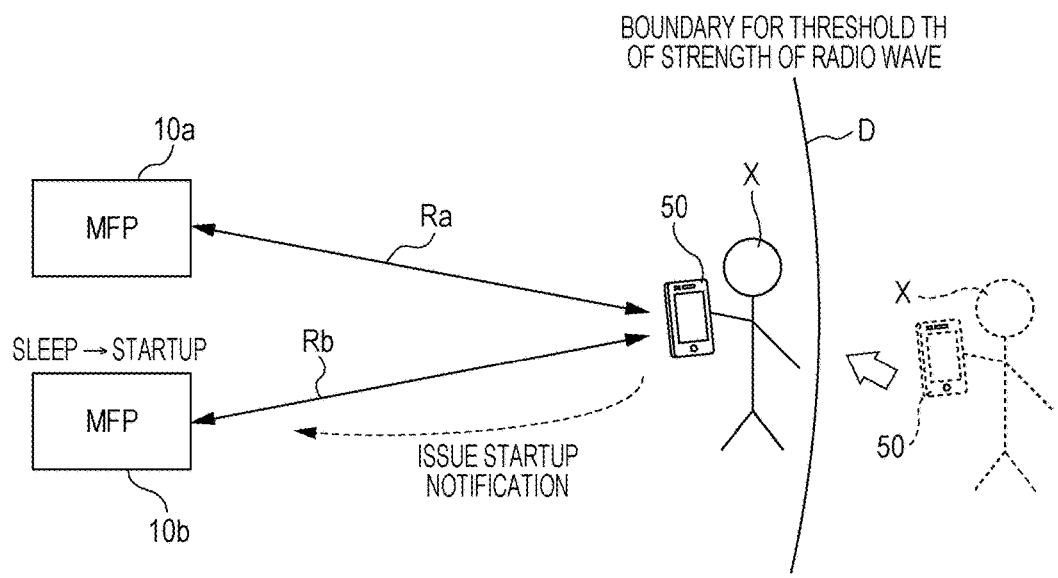
FIGS. 14A and 14B are explanatory diagrams for a case where control in the flowchart described in FIG. 13 is carried out.
Figure 14B:
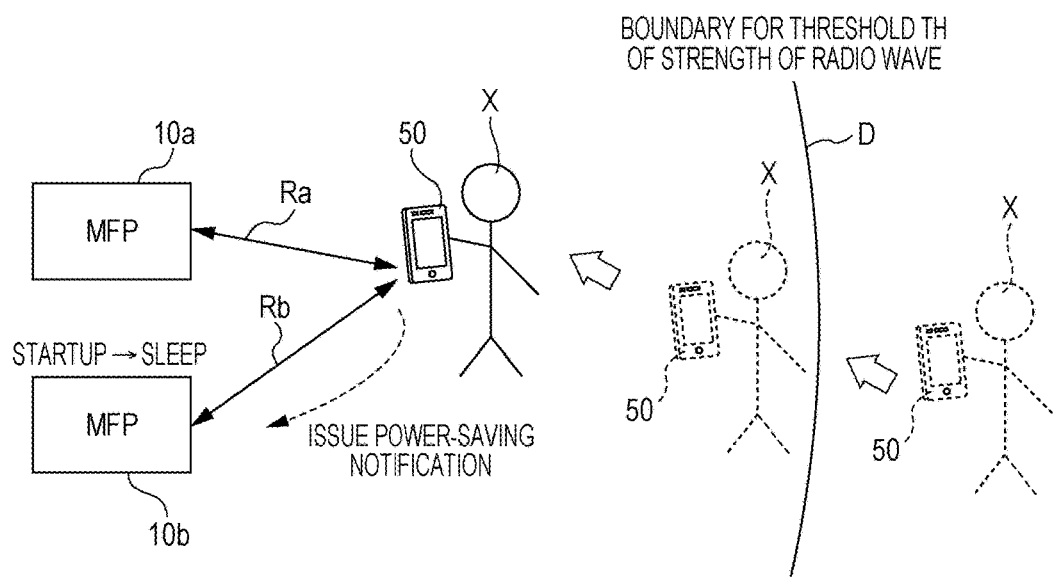

FIGS. 14A and 14B are explanatory diagrams for a case where control in the flowchart described in FIG. 13 is carried out.

As in the case illustrated in FIG. 6, an example is illustrated therein for a case where two MFPs, namely, the MFP 10a and the MFP 10b are installed side by side and the user X positioned at substantially the same distances from the respective MFPs 10a and 10b approaches the MFP 10a in order to use the MFP 10a. Additionally, this example assumes the MFP 10b to be in the power-saving mode.

As illustrated in FIG. 14A, when the user X approaches the MFP 10a and the MFP 10b to use the MFP 10a, the portable terminal 50 confirms the strengths of radio waves of the respective MFPs 10a and 10b. The portable terminal 50 has acquired the device information from the respective MFPs 10a and 10b.

As the user X (the portable terminal 50) approaches the MFPs 10a and 10b, the strengths of radio waves of the MFPs 10a and 10b become equal to or larger than the predetermined threshold TH and thus the startup notification is issued to the MFP 10b in the power-saving mode to cause the MFP 10b to start up.

Thereafter, as illustrated in FIG. 14B, at the time point when the user X further approaches the MFPs 10a and 10b and then the communication is established for the MFP 10a that the user X intends to use, among the other MFPs 10 for which the communication is not established, a switchover notification to the power-saving mode is issued to the MFP 10b that has started up from the power-saving mode due to the startup notification, to cause the MFP 10b to switch to the power-saving mode again.

When the MFP 10 that the user intends to use is in the power-saving mode, a certain time is required after data transmission for the MFP 10 to start up. For this reason, the MFP 10 has been configured to start up before the communication is established. Furthermore, in a case where the MFP 10 for which the communication is not established, in other words, the MFP 10 that the user does not intend to use is caused to start up, this MFP 10 is caused to switch to the power-saving mode again at the time point when the communication is established. As a result, the electric power consumption of the entire system is suppressed, while the MFP 10 to be linked which the user intends to use can be properly identified.

Other Embodiments

In the above-described embodiments, in a case where the MFP 10 and the portable terminal 50 are present within a range of the strength of radio wave equal to or larger than the predetermined threshold TH, in order to calculate the differences in the strengths of radio waves, the portable terminal 50 has treated all of the MFPs 10 as objects to be subjected to the calculation of the differences in the strengths of radio waves. However, when determining the differences in the strengths of radio waves, the portable terminal device 50 may acquire, from each of the MFPs 10, the device information indicating the state of that MFP 10. At this time, when the MFP 10 is determined to be in use based on the acquired device information, the portable terminal device 50 may carry out control for disabling the detected strength of radio wave of that MFP 10, that is, control for omitting the calculation of the difference in the strengths of radio waves for that MFP 10. As a result, when the MFP 10 that the user intends to use is in use, it is possible to prevent the portable terminal 50 from establishing unwanted communication with this MFP 10.

Additionally, the strength of radio wave of the MFP 10 may be disabled depending on a relationship between the action mode of the MFP 10 in use and a link mode with the MFP 10 which is set at the portable terminal 50, in other words, the action mode that the portable terminal device 50 has received from the user. For example, in a case where the action mode received at the portable terminal 50 is a copy mode or a touch-scan mode while the MFP 10 is in the copy action, because a scanner of the MFP 10 during the copy action cannot be used, it is preferable to disable the strength of radio wave of that MFP 10 to exclude that MFP 10 from the objects to be subjected to the calculation of the differences in the strengths of radio waves. On the other hand, in the case of giving an instruction for the box save mode in which data is saved from the portable terminal 50 to a box serving as a predetermined storage region, because it is unnecessary to use the scanner although the MFP 10 is in the copy action, no problem is caused. Therefore, it is preferable not to disable the strength of radio wave of that MFP 10 to include that MFP 10 in the objects to be subjected to the calculation of the differences in the strengths of radio waves. The action mode of the MFP 10 in use can be also determined based on the device information acquired from the MFP 10.

Furthermore, the MFP 10 with the strength of radio wave equal to or larger than the threshold TH but positioned relatively away from the respective MFPs 10 has a strong possibility of the service thereof being finished until the user reaches that MFP 10 even in use. Accordingly, the strength of radio wave thereof may not be disabled so as to be included in the objects to be subjected to the calculation of the differences in the strengths of radio waves. Specifically, a threshold TH1 larger than the threshold TH may be defined for the strength of radio wave such that, in regard to the MFP 10 with the strength of radio wave equal to or larger than the threshold TH but smaller than the threshold TH1, the strength of radio wave thereof is not disabled even in use (including being in use in the same action mode) so as to be included in the objects to be subjected to the calculation of the differences in the strengths of radio waves.

Alternatively, a configuration may be employed in which the portable terminal 50 continually acquires the device information of the MFP 10 and even when the MFP 10 is excluded from the objects to be subjected to the calculation of the differences in the strengths of radio waves due to being in use, the calculation of the difference in the strengths of radio waves is started therefor at the time point when information indicating that the service thereof is finished is acquired.

Meanwhile, a configuration may be employed in which a completion ratio of a job (action completion ratio), in other words, a percentage of the completion of the job is transmitted to the portable terminal 50 as the device information while the MFP 10 is carrying out the job and when the received completion ratio is equal to or larger than a predetermined value set in advance, the portable terminal 50 calculates the difference in the strengths of radio waves therefor by assuming that the service thereof is finished in a short time; on the other hand, when the completion ratio is smaller than the predetermined value, the portable terminal 50 does not calculate the difference in the strengths of radio waves therefor by assuming that it still takes time for the service thereof to be finished.

In addition, when it is detected that a person is present in front of the MFP 10 even while the MFP 10 is not in use, it is desirable that a service in such an action mode as requiring screen transition on the display unit 6b of the MFP 10, that is, a service in such an action mode as changing the display content of the display unit 6b be disabled from a reason that the display unit 6b cannot be operated or because of the viewpoint of security. Exemplary cases thereof include such an authentication mode as displaying an authentication screen for authenticating the portable terminal 50.

In the case of detecting that a person is present in front of the MFP 10, it is preferable that the strength of radio wave thereof be disabled so as to be excluded from the objects to be subjected to the calculation of the differences in the strengths of radio waves and at the time point when the presence of a person in front of the MFP 10 is no longer detected, the calculation of the differences in the strengths of radio waves be started.

According to an embodiment of the invention described in the above Item. 1, the portable terminal device detects the strengths of the radio waves output from the respective image processing devices while being moved as the user carrying the portable terminal device is moving. Among the plurality of image processing devices which has been detected to have the strength of radio wave equal to or larger than the preset first value, the differences in the strengths of radio waves between the image processing device with the maximum strength of radio wave and the other image processing devices are calculated, and the image processing device having the maximum strength of radio wave at a timing when one of the differences exceeds the preset second value is identified as an image processing device to be linked with the portable terminal device, in other words, an image processing device that the user intends to use. Specifically, the image processing device is identified not only based on the degree of the strength of radio wave but also in consideration of the differences in the strengths of radio waves between the image processing device with the maximum strength of radio wave and the other image processing devices. As a result, even in a case where inappropriate identification is produced when the image processing device is identified solely based on the degree of the strength of radio wave, the proper image processing device that the user intends to use can be accurately identified.

According to an embodiment of the invention described in the above Item. 2, the image processing device that the user intends to use is identified additionally in consideration of a change amount of the strength of radio wave, thereby further enhancing the identification accuracy.

According to an embodiment of the invention described in the above Item. 3, the difference in the strengths of radio waves is set in accordance with the action mode received at the portable terminal device. As a result, the identified image processing device is quickly caused to work in that action mode, whereby convenience for the user is ensured while the image processing device can be accurately identified.

According to an embodiment of the invention described in the above Item. 4, the difference in the strengths of radio waves is set in accordance with whether the image processing device is in the power-saving mode. As a result, even in a case where the image processing device that the user intends to use is in the power-saving mode, this situation is recognized earlier such that the image processing device can be quickly caused to recover from the power-saving mode.

According to an embodiment of the invention described in the above Item. 5, the difference in the strengths of radio waves is set in accordance with a transfer amount of data to be transferred to the image processing device from the portable terminal device. As a result, data transfer to the identified image processing device can be started earlier and also the image processing device can be quickly caused to carry out an action for the transferred data.

According to an embodiment of the invention described in the above Item. 6, a larger value of the difference in the strengths of radio waves is set for a case where the image processing device in use is present than a case where the image processing device in use is not present. As a result, an unwanted connection with the image processing device in use can be prevented.

According to an embodiment of the invention described in the above Item. 7, the startup instruction is given to the image processing device in the power-saving mode. As a result, even in a case where the image processing device that the user intends to use is in the power-saving mode, the power-saving mode is cancelled until the time when an instruction for an action is given thereto from the portable terminal device, whereby the image processing device can be caused to promptly carry out the action. Additionally, when the image processing device instructed to start up is not identified as the image processing device with the maximum strength of radio wave, that is, when the image processing device instructed to start up is not the image processing device that the user intends to use, that image processing device is instructed to switch to the power-saving mode and thus the instructed image processing device is switched to the power-saving mode again.

According to an embodiment of the invention described in the above Item. 8, the difference in the strengths of radio waves is not calculated for the image processing device in use. As a result, it is possible to prevent the image processing device in use from being identified as the image processing device that the user intends to use, whereby, while the image processing device is being used, the action instruction is prevented from being transmitted thereto from the portable terminal device.

According to an embodiment of the invention described in the above Item. 9, the difference in the strengths of radio waves is calculated even for the image processing device in use as in the case of the image processing device not in use, as long as the image processing device in use has the strength of radio wave equal to or larger than the first value but smaller than the second value larger than the first value, in other words, as long as the image processing device in use is located relatively away from the portable terminal device.

According to an embodiment of the invention described in the above Item. 10, the difference in the strengths of radio waves is calculated even for the image processing device in use in a case where the action mode in use does not match the action mode received at the portable terminal device because the image processing device can be caused to work in the action mode received at the portable terminal device.

According to an embodiment of the invention described in the above Item. 11, the calculation of the difference in the strengths of radio waves is restarted at the time point when the service of the image processing device in use is finished.

According to an embodiment of the invention described in the above Item. 12, the image processing device in use which has the action completion ratio equal to or larger than the predetermined value is included in the objects to be subjected to the identification of the image processing device that the user intends to use such that the difference in the strengths of radio waves is calculated therefor from a reason that the action thereof is considered to be completed in a short time.

According to an embodiment of the invention described in the above Item. 13, in a case where an action for which the image processing device is instructed by the portable terminal device is an action that changes the display content of the display unit of the image processing device while the presence of a user operating that image processing device is detected, that image processing device is excluded from the objects to be subjected to the identification of the image processing device that the user intends to use such that the difference in the strengths of radio waves is not calculated therefor from a reason that the user of the portable terminal device cannot use that image processing device and also because of the viewpoint of security.

According to an embodiment of the invention described in the above Item. 14, in a case where it is detected that a user of the image processing device is present though the image processing device is not in use, that image processing device is excluded from the objects to be subjected to the identification of the image processing device that the user intends to use such that the difference in the strengths of radio waves is not calculated therefor. At the time point when the presence of the user thereof is no longer detected, the difference in the strengths of radio waves is calculated again therefor so as to be included in the objects to be subjected to the identification.

According to embodiments of the invention described in the above Items. 15 and 16, the strength of the radio wave from the image processing device is detected, whereby the proper image processing device that the user intends to use can be accurately identified.

According to an embodiment of the invention described in the above Item. 17, the computer of the portable terminal device is caused to carry out the processing for detecting the strength of the radio wave from the image processing device and then accurately identifying the proper image processing device that the user intends to use.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A portable terminal device, comprising:
    a receiving unit that receives an action instruction in a predetermined action mode given by a user for one image processing device among a plurality of image processing devices capable of wirelessly communicating with the portable terminal device;
    a radio wave strength detection unit that receives a radio wave for measuring the strength of the radio wave output from each of the image processing devices while the portable terminal device is being moved as the user carrying the portable terminal device is moving, to detect the strength of radio wave of each of the image processing devices;
    a radio wave strength difference calculation unit that calculates differences in the strengths of radio waves between the image processing device with the maximum strength of radio wave and the other image processing devices among the plurality of image processing devices whose strengths of radio waves detected by the radio wave strength detection unit are equal to or larger than a preset first value;
    an identification unit that identifies, as the image processing device to which the action instruction received by the receiving unit is given, the image processing device having the maximum strength of radio wave at a timing when any of the differences exceeds a preset second value among the differences in the strengths of radio waves calculated by the radio wave strength difference calculation unit; and
    an instruction unit that gives the action instruction in the action mode received by the receiving unit to the image processing device identified by the identification unit.

2. The portable terminal device according to claim 1, further comprising a change amount detection unit that detects a change amount of the strength of radio wave, wherein
    in a case where the maximum strength of radio wave has the largest change amount detected by the change amount detection unit when compared with the change amounts of the strengths of radio waves of the other image processing devices, the identification unit identifies the image processing device with the maximum strength of radio wave as the image processing device to which the action instruction is given.

3. The portable terminal device according to claim 1, wherein
    the action mode includes at least two of a print mode, a scan mode, and a box save mode that saves data to a box serving as a predetermined storage region,
    the second value corresponds to each of the action modes such that a largest value is set for the box save mode and smaller values are set for the scan mode and the print mode in this order, and the identification unit uses the second value in accordance with the action mode which is received by the receiving unit to determine a timing when the second value is exceeded.

4. The portable terminal device according to claim 1, further comprising a device information acquisition unit that acquires information on whether each of the image processing devices is in a power-saving mode, wherein the second value is set to a smaller value for a case where the image processing device in the power-saving mode is present than a case where the image processing device in the power-saving mode is not present, and the identification unit uses the second value in accordance with the information on whether to be in the power-saving mode which is acquired by the device information acquisition unit, to determine a timing when the second value is exceeded.

5. The portable terminal device according to claim 1, further comprising a data amount acquisition unit that acquires an amount of data to be transferred to the image processing device under the action instruction to the image processing device, wherein the plurality of second values are set depending on the amount of data to be transferred such that a smaller value is set for a case where a larger amount of data is transferred than a case where a smaller amount of data is transferred, and the identification unit uses the second value in accordance with the amount of data to be transferred which is acquired by the data amount acquisition unit, to determine a timing when the second value is exceeded.

6. The portable terminal device according to claim 1, further comprising a device information acquisition unit that acquires information on whether each of the image processing devices is in use, wherein the second value is set to a larger value for a case where the image processing device in use is present than a case where the image processing device in use is not present, and the identification unit uses the second value in accordance with the information on whether to be in use which is acquired by the device information acquisition unit, to determine a timing when the second value is exceeded.

7. The portable terminal device according to claim 1, further comprising a device information acquisition unit that acquires information on whether each of the image processing devices is in the power-saving mode, wherein the instruction unit instructs the image processing device in the power-saving mode to start up and in a case where the image processing device instructed to start up is not identified as the image processing device with the maximum strength of radio wave by the identification unit, instructs the same image processing device to switch to the power-saving mode.

8. The portable terminal device according to claim 1, further comprising a device information acquisition unit that acquires information on whether each of the image processing devices is in use, wherein the radio wave strength difference calculation unit does not calculate the difference in the strengths of radio waves for the image processing device in use.

9. The portable terminal device according to claim 8, wherein the radio wave strength difference calculation unit calculates the difference in the strengths of radio waves for the image processing device with the strength of radio wave equal to or larger than the first value but smaller than the second value larger than the first value even while the image processing device is in use.

10. The portable terminal device according to claim 8, wherein the device information acquisition unit of the portable terminal device further acquires information on the action mode used in the image processing device in use, and in a case where the action mode in use does not match the action mode received at the receiving unit of the portable terminal device, the radio wave strength difference calculation unit calculates the difference in the strengths of radio waves for the image processing device in use.

11. The portable terminal device according to claim 8, wherein the radio wave strength difference calculation unit restarts to calculate the difference in the strengths of radio waves for the image processing device in use at a time point when a service of that image processing device is finished.

12. The portable terminal device according to claim 8, wherein the device information acquisition unit of the portable terminal device further acquires information on an action completion ratio of the image processing device in use, and the radio wave strength difference calculation unit calculates the difference in the strengths of radio waves for the image processing device with the action completion ratio equal to or larger than a predetermined value.

13. The portable terminal device according to claim 1, further comprising a user detection unit that detects the presence of a user operating each of the image processing devices, wherein in a case where an action received by the receiving unit is an action that changes display content of a display unit of the image processing device, the radio wave strength difference calculation unit does not calculate the difference in the strengths of radio waves for the image processing device for which the user detection unit detects that a user operating that image processing device is present.

14. The portable terminal device according to claim 1, further comprising:

a device information acquisition unit that acquires information on whether each of the image processing devices is in use; and a user detection unit that detects the presence of a user operating each of the image processing devices, wherein in a case where the image processing device is not in use but the presence of a user of that image processing device is detected, the radio wave strength difference calculation unit does not calculate the difference in the strengths of radio waves for that image processing device, and at a time point when the presence of the user is no longer detected, calculates the difference in the strengths of radio waves again for that image processing device.

15. A communication system, comprising:

a portable terminal device; and a plurality of image processing devices capable of wirelessly communicating with the portable terminal device, wherein the image processing device includes:

an execution unit that executes an action in an action mode for which an instruction is given from the portable terminal device; and a radio wave output unit that outputs a radio wave for measuring the strength of the radio wave, the portable terminal device includes:

a receiving unit that receives an action instruction in a predetermined action mode given by a user for one image processing device among the plurality of image processing devices;

a radio wave strength detection unit that receives the radio wave for measuring the strength of the radio wave output from each of the image processing devices while the portable terminal device is being moved as the user carrying the portable terminal device is moving, to detect the strength of radio wave of each of the image processing devices;

a radio wave strength difference calculation unit that calculates differences in the strengths of radio waves between the image processing device with the maximum strength of radio wave and the other image processing devices among the plurality of image processing devices whose strengths of radio waves detected by the radio wave strength detection unit are equal to or larger than a preset first value;

an identification unit that identifies, as the image processing device to which the action instruction received by the receiving unit is given, the image processing device having the maximum strength of radio wave at a timing when any of the differences exceeds a preset second value among the differences in the strengths of radio waves calculated by the radio wave strength difference calculation unit; and an instruction unit that gives the action instruction in the action mode received by the receiving unit to the image processing device identified by the identification unit.

16. A communication method carried out in a communication system including a portable terminal device and a plurality of image processing devices capable of wirelessly communicating with the portable terminal device, wherein the image processing device carries out:

an execution process of executing action in an action mode for which an instruction is given from the portable terminal device; and a radio wave output process of outputting a radio wave for measuring the strength of the radio wave, the portable terminal device carries out:

a receiving process of receiving an action instruction in a predetermined action mode given by a user for one image processing device among the plurality of image processing devices;

a radio wave strength detection process of receiving the radio wave for measuring the strength of the radio wave output from each of the image processing devices while the portable terminal device is being moved as the user carrying the portable terminal device is moving, to detect the strength of radio wave of each of the image processing devices;

a radio wave strength difference calculation process of calculating differences in the strengths of radio waves between the image processing device with the maximum strength of radio wave and the other image processing devices among the plurality of image processing devices whose strengths of radio waves detected through the radio wave strength detection process are equal to or larger than a preset first value;

an identification process of identifying, as the image processing device to which the action instruction received through the receiving process is given, the image processing device having the maximum strength of radio wave at a timing when any of the differences exceeds a preset second value among the differences in the strengths of radio waves calculated through the radio wave strength difference calculation process; and an instruction process of giving the action instruction in the action mode received through the receiving process to the image processing device identified through the identification process.

17. A non-transitory recording medium storing a computer readable communication program causing a computer of a portable terminal device carried by a user and capable of being moved as the user is moving to carry out:

a receiving process of receiving an action instruction in a predetermined action mode from the user for one image processing device among a plurality of image processing devices capable of wirelessly communicating with the portable terminal device;

a radio wave strength detection process of receiving a radio wave for measuring the strength of the radio wave output from the image processing device after the action instruction has been received through the receiving process, to detect the strength of radio wave of each of the image processing devices;

a radio wave strength difference calculation process of calculating differences in the strengths of radio waves between the image processing device with the maximum strength of radio wave and the other image processing devices among the plurality of image processing devices whose strengths of radio waves detected through the radio wave strength detection process are equal to or larger than a preset first value;

an identification process of identifying, as the image processing device to which the action instruction received through the receiving process is given, the image processing device having the maximum strength of radio wave at a timing when any of the differences exceeds a preset second value among the differences in the strengths of radio waves calculated through the radio wave strength difference calculation process; and an instruction process of giving the action instruction in the action mode received through the receiving process to the image processing device identified through the identification process.

* * * * *